(12) United States Patent
Ueno

(10) Patent No.: US 8,494,796 B2
(45) Date of Patent: *Jul. 23, 2013

(54) COUNTING DEVICE, PHYSICAL QUANTITY SENSOR, COUNTING METHOD AND PHYSICAL QUANTITY MEASURING METHOD

(75) Inventor: Tatsuya Ueno, Tokyo (JP)

(73) Assignee: Azbil Corporation, Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 12/849,330

(22) Filed: Aug. 3, 2010

(65) Prior Publication Data

US 2011/0032959 A1 Feb. 10, 2011

(30) Foreign Application Priority Data

Aug. 4, 2009 (JP) ................................. 2009-181442

(51) Int. Cl.
*G01R 13/02* (2006.01)

(52) U.S. Cl.
USPC ............... 702/67; 702/34; 702/106; 702/108; 702/127

(58) Field of Classification Search
None
See application file for complete search history.

(56) References Cited

U.S. PATENT DOCUMENTS

| 4,066,999 | A | 1/1978 | Spanjersberg | |
|---|---|---|---|---|
| 6,872,931 | B2 | 3/2005 | Liess et al. | |
| 7,684,957 | B2* | 3/2010 | Ueno | 702/158 |
| 7,911,593 | B2* | 3/2011 | Ueno | 356/28.5 |
| 7,961,302 | B2* | 6/2011 | Ueno | 356/28.5 |
| 2009/0195771 | A1* | 8/2009 | Ueno | 356/28.5 |
| 2009/0257067 | A1 | 10/2009 | Chapman et al. | |
| 2010/0332171 | A1* | 12/2010 | Ueno | 702/71 |

FOREIGN PATENT DOCUMENTS

| EP | 1978377 A2 | 10/2008 |
|---|---|---|
| EP | 2085789 A2 | 8/2009 |
| JP | 2004-513348 A | 4/2004 |
| JP | 2006-313080 A | 11/2006 |
| JP | 2009-47676 A | 3/2009 |

* cited by examiner

*Primary Examiner* — Andrew Schechter
*Assistant Examiner* — Ivan Rabovianski
(74) *Attorney, Agent, or Firm* — Troutman Sanders LLP

(57) ABSTRACT

The counting device includes: a signal counter that counts the number of half cycles of input signals during given counting periods; a signal half cycle measurement unit that measures the half cycles; a frequency distribution generator that generates a frequency distribution of the half cycles; a representative value calculator configured to calculate a representative value of a distribution of the half cycles; a correction value calculator configured to calculate a total number Ns and a total number $Nw_n$ so as to correct the number of the half cycles, wherein Ns represents the total of the number of the half cycles that are less than 0.5 times the represent value, and $Nw_n$ represents the total of the number of the half cycles that are equal to or greater than 2n and less than (2n+2) times the representative value.

14 Claims, 33 Drawing Sheets

COUNTING DEVICE, PHYSICAL QUANTITY SENSOR, COUNTING METHOD AND PHYSICAL QUANTITY MEASURING METHOD

CROSS-REFERENCE TO RELATED APPLICATION

This application claims priority from Japanese Patent Application No. 2009-181442, filed on Aug. 4, 2009, the entire contents of which are hereby incorporated by reference.

BACKGROUND

1. Technical Field

The present invention relates to a counting device which counts the number of signals, and an interference type physical quantity sensor which measures the number of interference waveforms using the counting device and obtains physical quantities of an object to be measured.

2. Related Art

In the related art, there has been proposed a laser measurement device of a wavelength modulation type using a self-coupling effect of a semiconductor laser (see JP-A-2006-313080). FIG. 32 shows a configuration of such a laser measurement device. As shown in FIG. 32, the laser measurement device includes a semiconductor laser 201 which emits laser light to an object 210, a photodiode 202 which converts light output of the semiconductor laser 201 into an electrical signal, a lens 203 which condenses light from the semiconductor laser 201, which is then emitted to the object 210, and condenses return light from the object 210, which is then incident into the semiconductor laser 201, a laser driver 204 which drives the semiconductor laser 201 to alternatively repeat a first oscillation period during which an oscillation wavelength continuously increases and a second oscillation period during which the oscillation wave length continuously decreases, a transimpedance amplifier 205 which converts an output current of the photodiode 202 into a voltage and amplifies the voltage, a signal extraction circuit 206 which differentiates an output voltage of the transimpedance amplifier 205 twice, a counting device 207 which counts the number of mode hop pulses (MHPs) contained in an output voltage of the signal extraction circuit 206, a computing device 208 which calculates a distance to the object 210 and a speed of the object 210, and a display 209 which displays a result of the calculation by the computing device 208.

The laser driver 204 supplies a triangular wave driving current with repeated increase/decrease at a constant rate of change in terms of time, as an injection current, to the semiconductor laser 201. Thus, the semiconductor laser 201 is driven to alternate between the first oscillation period during which the oscillation wavelength continuously increases at a constant rate of change and the second oscillation period during which the oscillation wavelength continuously decreases at a constant rate of change. FIG. 33 shows a temporal change of the oscillation wavelength of the semiconductor laser 201. In FIG. 33, P1, P2, λa, λb, and Tt represent the first oscillation period, the second oscillation period, the minimum value of the oscillation wavelength for each oscillation period, the maximum value of the oscillation wavelength for each oscillation period, and a cycle of a triangular wave, respectively.

Laser light emitted from the semiconductor laser 201 is condensed by the lens 203 and then is incident into the object 210. Light reflected by the object 210 is condensed by the lens 203 and then is incident into the semiconductor laser 201. The photodiode 202 converts light output of the semiconductor laser 201 into a current. The transimpedance amplifier 205 converts an output voltage of the photodiode 202 into a voltage and amplifies the voltage, and the signal extraction circuit 206 differentiates an output signal of the transimpedance amplifier 205 twice. The counting device 207 counts the number of MHPs, which are contained in an output voltage of the signal extraction circuit 206, for each of the first oscillation period P1 and the second oscillation period P2. The computing device 208 calculates a distance to the object 210 and a speed of the object 210 based on the minimum oscillation wavelength λa and the maximum oscillation wavelength λb of the semiconductor laser 201, the number of MHPs for the first oscillation period P1, and the number of MHPs for the second oscillation period P2. When the number of MHPs is measured using the technology of such a self-coupling type laser measurement device, it is possible to calculate a vibration frequency of the object from the number of MHPs.

The above-mentioned laser measurement device has problems in that errors occur in physical quantities such as the calculated distance, the calculated vibration frequency due to an error of the number of MHPs counted by the counting device, which occurs when noise, such as disturbance light or the like, is counted as MHPs or uncountable MHPs are present due to omission of signals.

Therefore, the present inventor(s) has suggested a counting device which is capable of eliminating an effect of deficient counting or excessive counting by measuring a cycle of MHPs during a counting period, generating a frequency distribution of the cycle during the counting period from a result of the measurement, calculating a representative value of the cycle of MHPs from the frequency distribution, obtaining the total sum Ns of frequencies of a class which is equal to or less than a first predetermined multiple of the representative value, and the total sum Nw of frequencies in a class which is equal to or more than a second predetermined multiple of the representative value from the frequency distribution, and correcting a counting result of MHPs based on these frequencies Ns and Nw (see JP-A-2009-47676).

The counting device disclosed in JP-A-2009-47676 can achieve a generally good correction as long as a SNR (Signal to Noise Ratio) is not extremely lowered.

However, with the counting device disclosed in JP-A-2009-47676, if a signal strength is extremely high in short range measurement as compared to a hysteresis width, there may be a case where chattering occurs near a binarization threshold value in a signal input to the counting device due to noise having a frequency higher than that of MHP and signals having a short cycle or signals having a cycle which is about half the original cycle of MHP are frequently generated. In this case, since the cycle shorter than the original cycle of MHP becomes a representative value of a distribution of cycle, there arises a problem in that a counting result of MHP can not be properly corrected and becomes larger by several times or so than its original value.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an illustrative aspect of the present invention to provide a counting device and a counting method which are capable of correcting a counting error even when a high frequency noise continuously occurs in a signal input to the counting device, and a physical quantity sensor and a physical quantity measuring method which are capable of improving precision of measurement on physical quantities by correcting a counting error of MHP.

According to one or more illustrative aspects of the present invention, there is provided a counting device which counts the number of signals having a linear relationship with a specific physical quantity, wherein the signals have substantially a single frequency if the specific physical quantity is constant. The device includes: a signal counter configured to count the number of half cycles of input signals during given counting periods; a signal half cycle measurement unit configured to measure the half cycles of the input signals during the given counting periods whenever a half cycle of the signal is input; a frequency distribution generator configured to generate a frequency distribution of the half cycles of the input signals during the given counting periods, based on a measurement result from the signal half cycle measurement unit; a representative value calculator configured to calculate a representative value of a distribution of the half cycles of the input signals, based on the frequency distribution; and a correction value calculator configured to calculate, based on the measurement result from the signal half cycle measurement unit, a total number Ns and a total number $Nw_n$ so as to correct the number of the half cycles of the input signals counted by the signal counter, wherein Ns represents the total of the number of the half cycles that are less than 0.5 times the represent value, and $Nw_n$ represents the total of the number of the half cycles that are equal to or greater than 2n and less than (2n+2) times the representative value, where n is a natural number of 1 or more.

According to one or more illustrative aspects of the present invention, the correction value calculator is configured to calculate the corrected number N' of the half cycles of the input signal, based on the following expression:

$$N' = \frac{1}{2}\left\{N - Ns + \sum_{n=1}^{n_{max}} (2n \times Nw_n)\right\}$$

$$n_{max} \leq \frac{T_{max}}{T0}$$

wherein the number of the half cycles of the input signals counted by the signal counter is N, the representative value is T0 and the maximum value of the half cycles of the input signals is $T_{max}$.

According to one or more illustrative aspects of the present invention, the device further includes: a signal combination unit configured to combine a first half cycle that is less than 0.5 times the representative value with at least one of second half cycles measured before and after the first half cycle so as to set the combined half cycle as a new half cycle of a signal waveform, wherein the signal counter is configured to count the number of the half cycles containing the new half cycles combined by the signal combination unit.

According to one or more illustrative aspects of the present invention, when the combined half cycle is less than 0.5 times the representative value, the signal combination unit continues to perform the combination process until newly-combined half cycle is equal to or greater than 0.5 times the representative value.

According to one or more illustrative aspects of the present invention, when the first half cycle that is less than 0.5 times the representative value is between an m-th half cycle Tm and a p-th half cycle Tp, where Tm and Tp are equal to or greater than 0.5 times the representative value, and m and p are natural numbers, the signal combination unit is configured to: combine half cycles ranging from the half cycle Tm to the half cycle Tp so as to set the combined cycle as the m-th half cycle Tm, if (m+p) is an even number; and combine half cycles ranging from the half cycle Tm to a half cycle Tn-1 so as to set the combined cycle as the m-th half cycle Tm, if (m+p) is an odd number.

According to one or more illustrative aspects of the present invention, the representative value is one of the median, the mode, the mean and a class value, the class value having a maximum value obtained by multiplying the class value by a frequency corresponding to the class value.

According to one or more illustrative aspects of the present invention, there is provided a counting device which counts the number of signals having a linear relationship with a specific physical quantity, wherein the signals have substantially a single frequency if the specific physical quantity is constant. The device includes: a signal cycle measurement unit configured to measure cycles of input signals during given counting periods whenever a signal is input; a frequency distribution generator configured to generate a frequency distribution of the cycles of the input signals during the given counting periods, based on a measurement result from the signal cycle measurement unit; a representative value calculator configured to calculate a representative value of a distribution of the cycles of the input signals, based on the frequency distribution; a signal combination unit configured to combine a first cycle that is less than 0.5 times the representative value with a cycle measured immediately after the first cycle so as to set the combined cycle as a new cycle of a signal waveform, wherein when the combined cycle is less than 0.5 times the representative value, the signal combination unit continues to perform the combination process until newly-combined cycle is equal to or greater than 0.5 times the representative value; a signal counter configured to count the number of the cycles of the input signals during the given counting period, wherein the number of the cycles contains the new half cycles combined by the signal combination unit; and a correction value calculator configured to calculate, based on the measurement result from the signal cycle measurement unit, a total number Ns and a total number $Nw_n$ so as to correct the number of the cycles of the input signals counted by the signal counter, based on the total number Ns and the total number $Nw_n$, wherein Ns represents the total of the number of the half cycles that are less than 0.5 times the represent value, and $Nw_n$ represents the total of the number of the half cycles that are equal to or greater than (n+0.5) and less than (n+1.5) times the representative value, where n is a natural number of 1 or more.

According to one or more illustrative aspects of the present invention, the correction value calculator is configured to calculate the corrected number N' of the cycles of the input signals, based on the following expression:

$$N' = N - Ns + \sum_{n=1}^{n_{max}} (n \times Nw_n)$$

$$n_{max} \leq \frac{T_{max}}{T0}$$

wherein the number of the cycles of the input signals counted by the signal counter is N, the representative value is T0 and the maximum value of the cycles of the input signals is $T_{max}$.

According to one or more illustrative aspects of the present invention, the representative value is one of the median, the mode, the mean and a class value, the class value having a maximum value obtained by multiplying the class value by a frequency corresponding to the class value.

According to one or more illustrative aspects of the present invention, there is provided a physical quantity sensor. The physical quantity sensor includes: a semiconductor laser which emits laser light to an object to be measured; an oscillation wavelength modulator configured to operate the semiconductor laser such that at least one of a first oscillation period and a second oscillation period repeatedly exists, wherein an oscillation wavelength continuously and monotonically increases during the first oscillation period, and the oscillation wavelength continuously and monotonically decreases during the second oscillation period; a detector configured to detect electrical signals including interference waveforms, the interference waveforms being caused by a self-coupling effect of the laser light emitted from the semiconductor laser and return light from the object; the counting device, which counts the number of interference waveforms, wherein the input signals are the electrical signals outputted from the detector, and the given counting periods are the first and second oscillation periods; and a computing unit configured to calculate a physical quantity of the object based on a counting result from the counting device.

According to one or more illustrative aspects of the present invention, there is provided a method of counting the number of signals having a linear relationship with a specific physical quantity, wherein the signals have substantially a single frequency if the specific physical quantity is constant. The method includes: (a) counting the number of half cycles of an input signal during given counting periods; (b) measuring the half cycles of the input signals during the given counting periods whenever a half cycle of the signal is input; (c) generating a frequency distribution of the half cycles of the input signals during the given counting periods, based on a measurement result in the step (b); (d) calculating a representative value of a distribution of the half cycles of the input signals, based on the frequency distribution; and (e) calculating, based on the measurement result in step (b), a total number Ns and a total number $Nw_n$ so as to correct the number of the half cycles of the input signals in step (a), wherein Ns represents the total of the number of the half cycles that are less than 0.5 times the represent value, and $Nw_n$ represents the total of the number of the half cycles that are equal to or greater than 2n and less than (2n+2) times the representative value, where n is a natural number of 1 or more.

According to one or more illustrative aspects of the present invention, step (e) comprises: calculating the corrected number N' of the half cycles of the input signal, based on the following expression:

$$N' = \frac{1}{2}\left\{N - Ns + \sum_{n=1}^{n_{max}} (2n \times Nw_n)\right\}$$

$$n_{max} \leq \frac{T_{max}}{T0}$$

wherein the number of the half cycles of the input signals counted in step (a) is N, the representative value is T0 and the maximum value of the half cycles of the input signals is $T_{max}$.

According to one or more illustrative aspects of the present invention, the method further includes: (f) combining a first half cycle that is less than 0.5 times the representative value with at least one of second half cycles measured before and after the first half cycle so as to set the combined half cycle as a new half cycle of a signal waveform, wherein step (a) comprises: counting the number of the half cycles containing the new half cycles combined by the signal combination unit.

According to one or more illustrative aspects of the present invention, when the combined half cycle is less than 0.5 times the representative value, step (f) comprises: continuing to perform the combination process until newly-combined half cycle is equal to or greater than 0.5 times the representative value.

According to one or more illustrative aspects of the present invention, when the first half cycle that is less than 0.5 times the representative value is between an m-th half cycle Tm and a p-th half cycle Tp, where Tm and Tp are equal to or greater than 0.5 times the representative value, and m and p are natural numbers, step (f) includes: combining half cycles ranging from the half cycle Tm to the half cycle Tp so as to set the combined cycle as the m-th half cycle Tm, if (m+p) is an even number; and combining half cycles ranging from the half cycle Tm to a half cycle Tn-1 so as to set the combined cycle as the m-th half cycle Tm, if (m+p) is an odd number.

According to one or more illustrative aspects of the present invention, the representative value is one of the median, the mode, the mean and a class value, the class value having a maximum value obtained by multiplying the class value by a frequency corresponding to the class value.

According to one or more illustrative aspects of the present invention, there is provided a method of counting the number of signals having a linear relationship with a specific physical quantity, wherein the signals have substantially a single frequency if the specific physical quantity is constant. The method includes: (a) measuring cycles of input signals during given counting periods whenever a signal is input; (b) generating a frequency distribution of the cycles of the input signals during the given counting periods, based on a measurement result in step (a); (c) calculating a representative value of a distribution of the cycles of the input signals, based on the frequency distribution; (d) combining a first cycle that is less than 0.5 times the representative value with a cycle measured immediately after the first cycle so as to set the combined cycle as a new cycle of a signal waveform, wherein when the combined cycle is less than 0.5 times the representative value, wherein step (d) comprises: continuing to perform the combination process until newly-combined cycle is equal to or greater than 0.5 times the representative value; (e) counting the number of the cycles of the input signals during the given counting period, wherein the number of the cycles contains the new half cycles combined in step (d); and (f) calculating, based on the measurement result in step (a), a total number Ns and a total number $Nw_n$ so as to correct the number of the cycles of the input signals counted in step (e), wherein Ns represents the total of the number of the half cycles that are less than 0.5 times the represent value, and $Nw_n$ represents the total of the number of the half cycles that are equal to or greater than (n+0.5) and less than (n+1.5) times the representative value, where n is a natural number of 1 or more.

According to one or more illustrative aspects of the present invention, step (f) includes: calculating the corrected number N' of the half cycles of the input signal, based on the following expression:

$$N' = N - Ns + \sum_{n=1}^{n_{max}} (n \times Nw_n)$$

$$n_{max} \leq \frac{T_{max}}{T0}$$

wherein the number of the cycles of the input signals counted in step (e) is N, the representative value is T0 and the maximum value of the cycles of the input signals is $T_{max}$.

According to one or more illustrative aspects of the present invention, the representative value is one of the median, the mode, the mean and a class value, the class value having a maximum value obtained by multiplying the class value by a frequency corresponding to the class value.

According to one or more illustrative aspects of the present invention, there is provided a physical quantity measuring method. The method includes: (a) operating a semiconductor laser, which emits laser light to an object to be measured, such that at least one of a first oscillation period and a second oscillation period repeatedly exists, wherein an oscillation wavelength continuously and monotonically increases during the first oscillation period, and the oscillation wavelength continuously and monotonically decreases during the second oscillation period; (b) detecting electrical signals including interference waveforms, the interference waveforms being caused by a self-coupling effect of the laser light emitted from the semiconductor laser and return light from the object; (c) counting the number of interference waveforms in accordance with the above-mentioned method, wherein the input signals are the electrical signals, and the given counting periods are the first and second oscillation periods; and (d) calculating a physical quantity of the object based on a counting result obtained in step (c).

According to the present invention, by counting the number of half cycles of the input signal during the counting period, measuring the half cycle of the input signal during the counting period, generating the frequency distribution of the half cycle of the input signal during the counting period from this measurement result, calculating the representative value of the distribution of half cycles of the input signal from the frequency distribution, obtaining the total sum Ns of the number of half cycles which are smaller than ½ of the representative value, and the total sum $Nw_n$ of the number of half cycles, which are equal to or larger than 2n times and smaller than (2n+2) times the representative value, and correcting the counting result of the signal counter based on the frequencies Ns and $Nw_n$, a counting error can be corrected with high precision even when high frequency noise continuously occurs in a signal input to the counting device.

In addition, in the present invention, by providing the signal combination unit for taking a cycle, which is a combination of a half cycle which is smaller than ½ of the representative value and at least one of half cycles measured before and after that, as a half cycle after combination for the measurement result of the signal half cycle measurement unit, and taking a signal waveform generated by combining cycles as a waveform corresponding to a half cycle of one signal, and by counting the number of signals after processing of the signal combination unit during the counting period, instead of counting the number of input signals, by unit of the signal counter, a counting error can be further reduced.

In addition, in the present invention, for the measurement result of the signal half cycle measurement unit, as the signal combination unit performs a process of taking a cycle, which is a combination of a half cycle smaller than ½ of the representative value and a half cycle measured immediately thereafter, as a half cycle after combination, and taking a signal waveform generated by combining cycles as a waveform corresponding to a half cycle of one signal, until the half cycle after combination reaches ½ or more of the representative value, a counting error can be further reduced.

In addition, in the present invention, for the measurement result of the signal half cycle measurement unit, if a half cycle smaller than ½ of the representative value lies between an m-th half cycle Tm which is equal to or larger than ½ of the representative value and a p-th half cycle Tp which is equal to or larger than ½ of the representative value (m and p are natural numbers), as the signal combination unit takes a cycle, which is a combination of from the half cycle Tm to the half cycle Tp, as a half cycle after combination if (m+p) is an even number, takes a cycle, which is a combination of from the half cycle Tm to a half cycle Tn-1, as a half cycle after combination if (m+p) is an odd number, and takes a signal waveform generated by combining cycles as a waveform corresponding to the m-th half cycle, a counting error can be reduced even if burst noise or popcorn noise having a cycle which is equal to or larger than a ¼ cycle of a signal of an object to be measured is mixed in a signal input to the counting device.

In addition, in the present invention, by measuring a cycle of an input signal during a counting period, generating a frequency distribution of the cycle of the input signal during the counting period from this measurement result, calculating a representative value of a distribution of the cycle of the input signal from the frequency distribution, performing a process of taking a cycle, which is a combination of a cycle which is smaller than ½ of the representative value and a cycle measured immediately thereafter, as a cycle after combination for the cycle measurement result, and taking a signal waveform generated by combining cycles as a waveform corresponding to one cycle of one signal, until the cycle after combination reaches ½ or more of the representative value, counting the number of signals after processing of the signal combination unit during the counting period, obtaining the total sum Ns of the number of cycles which are smaller than ½ of the representative value, and the total sum $Nw_n$ of the number of cycles, which are equal to or larger than (n+0.5) times and smaller than (n+1.5) times the representative value calculated by the second representative value calculating unit, from a processing result of the signal combination unit, and correcting a counting result of the signal counter based on the frequencies Ns and $Nw_n$, a counting error can be corrected with high precision even when high frequency noise continuously occurs in a signal input to the counting device.

In addition, in the present invention, by using the counting device which is capable of correcting a counting error with high precision, it is possible to measure physical quantities of an object to be measured with high precision even if noise having a frequency higher than that of an interference waveform continuously occurs in a signal input to the counting device.

DETAILED DESCRIPTION OF EXEMPLARY EMBODIMENTS

[First Embodiment]

Figure 1:
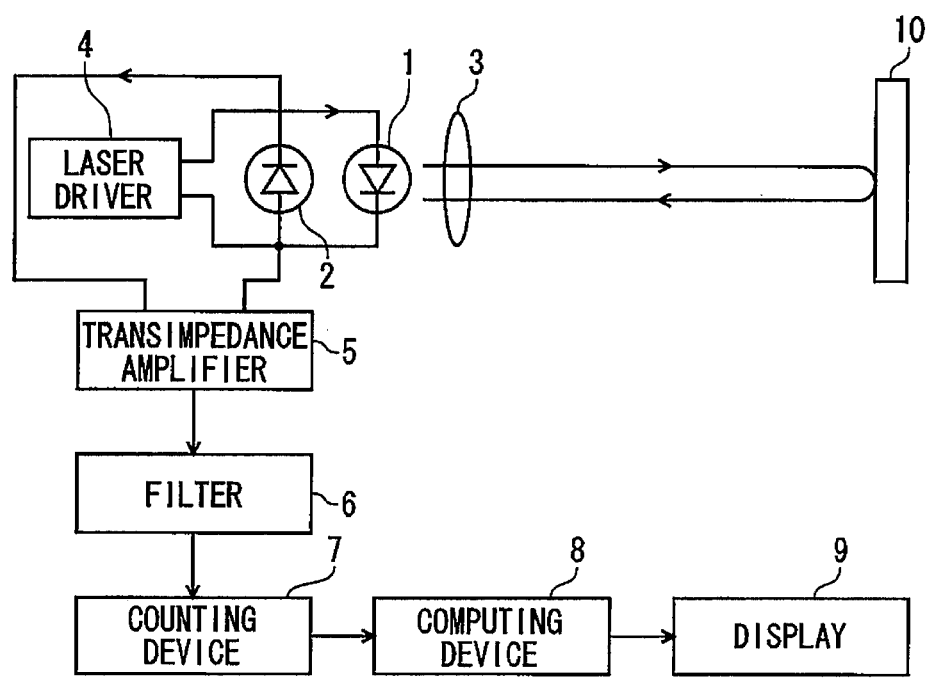
FIG. 1 is a block diagram showing a configuration of a vibration frequency measurement device according to a first embodiment of the present invention.

Hereinafter, embodiments of the present invention will be described with reference to the drawings. FIG. 1 is a block diagram showing a configuration of a vibration frequency measurement device according to a first embodiment of the present invention.

Referring to FIG. 1, a vibration frequency measurement device includes a semiconductor laser 1 which emits laser light to an object 10 to be measured, a photodiode 2 which converts light output of the semiconductor laser 1 into an electrical signal, a lens 3 which condenses light from the semiconductor laser 1, which is then emitted to the object 10, and condenses return light from the object 10, which is then incident into the semiconductor laser 1, a laser driver 4 which serves as an oscillation wavelength modulator for driving the semiconductor laser 1, a transimpedance amplifier 5 which converts an output current of the photodiode 2 into a voltage and amplifies the voltage, a filter 6 which removes a carrier wave from an output voltage of the transimpedance amplifier 5, a counting device 7 which counts the number of mode hop pulses (MHPs), which are self-coupling signals contained in the output voltage of the filter 6, a computing device 8 which calculates a vibration frequency of the object 10 based on a counting result of the counting device 7, and a display 9 which displays a measurement result of the computing device 8.

The photodiode 2 and the transimpedance amplifier 5 constitute a detector. Hereinafter, for the purpose of facilitation of description, it is assumed that the semiconductor laser 1 used is of a type having no mode hopping effect (for example, VCSEL type, DFB laser type, etc.).

Figure 33:
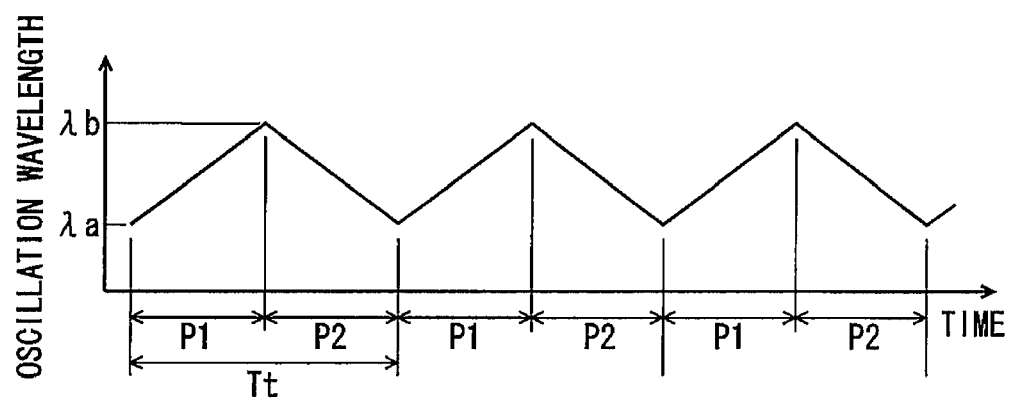
FIG. 33 is a view showing one example of temporal change of an oscillation wavelength of a semiconductor laser in the laser measuring instrument shown in FIG. 32.

The laser driver 4 supplies a triangular wave driving current with repeated increase/decrease at a constant rate of change in terms of time, as an injection current, to the semiconductor laser 1. Thus, the semiconductor laser 1 is driven to alternate between a first oscillation period P1 during which the oscillation wavelength continuously increases at a constant rate of change in proportion to the magnitude of the injection current and a second oscillation period P2 during which the oscillation wavelength continuously decreases at a constant rate of change. In this case, the temporal change of the oscillation wavelength of the semiconductor laser 1 is as shown in FIG. 33. In this embodiment, the maximum value λb of the oscillation wavelength, the minimum value λa of the oscillation wavelength and the difference λb−λa therebetween are always constant.

Laser light emitted from the semiconductor laser 1 is condensed by the lens 3 and then is incident into the object 10. Light reflected by the object 10 is condensed by the lens 3 and then is incident into the semiconductor laser 1. However, light condensation by the lens 3 is not essential. The photodiode 2 is disposed within or near the semiconductor laser 1 and converts a light output of the semiconductor laser 1 to a current. The transimpedance amplifier 5 converts an output current of the photodiode 2 into a voltage and amplifies the voltage.

Figure 2A:
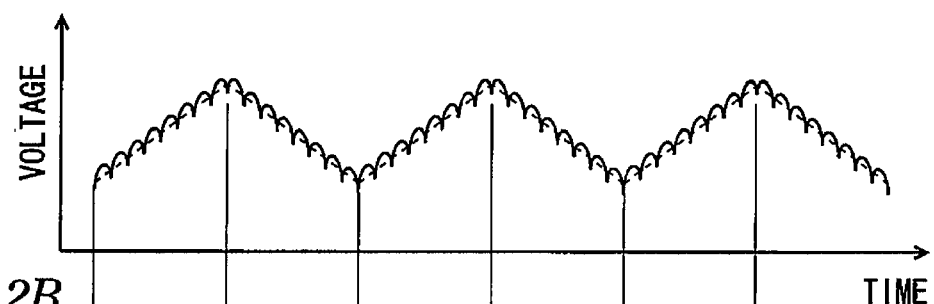
FIGS. 2A and 2B are waveform diagrams schematically showing an output voltage waveform of a transimpedance amplifier and an output voltage waveform of a filter according to the first embodiment of the present invention.
Figure 2B:
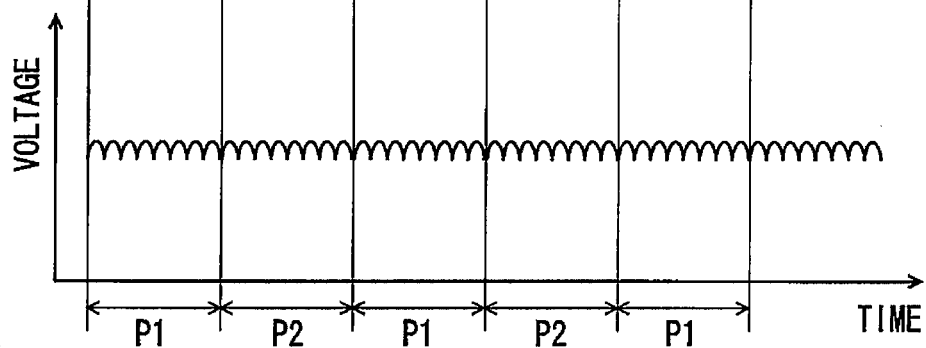

The filter 6 is configured to extract a superpositional signal from a modulated wave. FIG. 2A is a waveform diagram schematically showing an output voltage waveform of the transimpedance amplifier 5 and FIG. 2B is a waveform diagram schematically showing an output voltage waveform of the filter 6. These figures show a procedure of extracting an MHP waveform (interference waveform) shown in FIG. 2B by removing an oscillation waveform (carrier wave) of the semiconductor laser 1 from a waveform (modulated wave) of FIG. 2A corresponding to an output of the photodiode 2.

Figure 3:
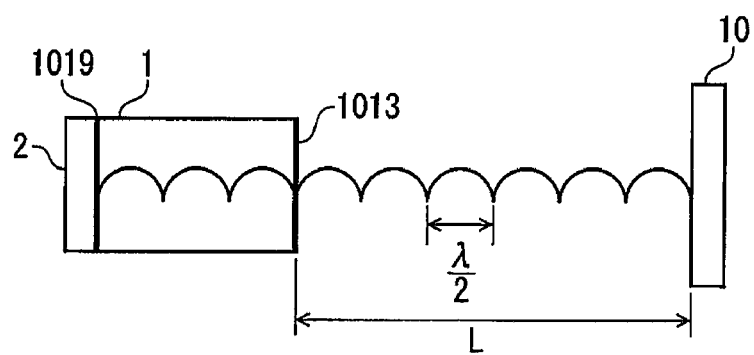
FIG. 3 is a view for explaining a mode hop pulse.

Here MHP, which is a self-coupling signal, will be described. As shown in FIG. 3, assuming that the distance from a mirror layer 1013 to the object 10 is L and the laser oscillation wavelength is λ, return light from the object 10 and laser light within a photonic resonator of the semiconductor laser 1 constructively interfere with each other when the following resonance condition is satisfied, thereby slightly increasing laser output.

$$L=q\lambda/2 \quad (1)$$

In equation (1), q is an integer. This effect may be sufficiently observed through an amplification action which is caused as the apparent reflectivity in the resonator of the semiconductor laser 1 is increased even if scattered light from the object 10 is very weak.

Figure 4:
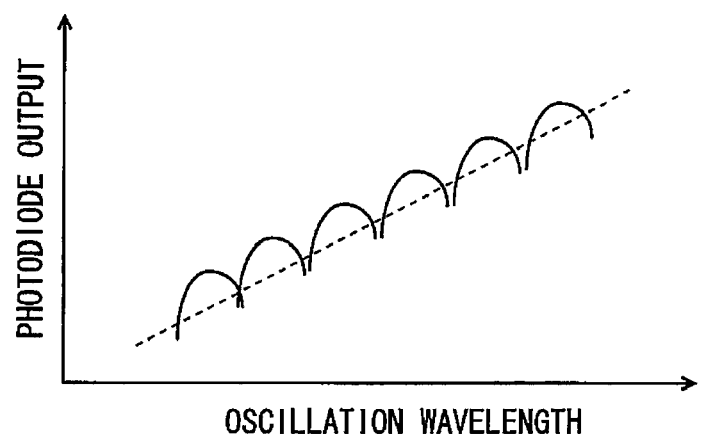
FIG. 4 is a view showing the relationship between an oscillation wavelength of a semiconductor laser and an output waveform of a photodiode.

FIG. 4 is a view showing the relationship between an oscillation wavelength of the semiconductor laser 1, which is changed at a constant rate, and an output waveform of the photodiode 2. If the equation (1), $L=q\lambda/2$, is satisfied, a phase difference between the return light and the laser light in the photonic resonator becomes 0° (in phase), which results in the highest constructive interference between the return light and the laser light in the photonic resonator. However, if $L=q\lambda/2+\lambda/4$, the phase difference reaches 180° (out of phase), which results in the lowest constructive interference between the return light and the laser light in the photonic resonator. Accordingly, the laser output alternates between the strongest point and the weakest point upon varying the oscillation wavelength of the semiconductor laser 1. At this time, when the laser output is detected by the photodiode 2, a stepped waveform with a constant cycle is obtained as shown in FIG. 4. Such a waveform is generally called an "interference pattern." Every component of the stepped waveform (or the interference pattern) is referred to as "MHP." When the oscillation wavelength of the semiconductor laser 1 is varied for a certain period of time, the number of MHPs is varied in proportion to a measurement distance.

Figure 5:
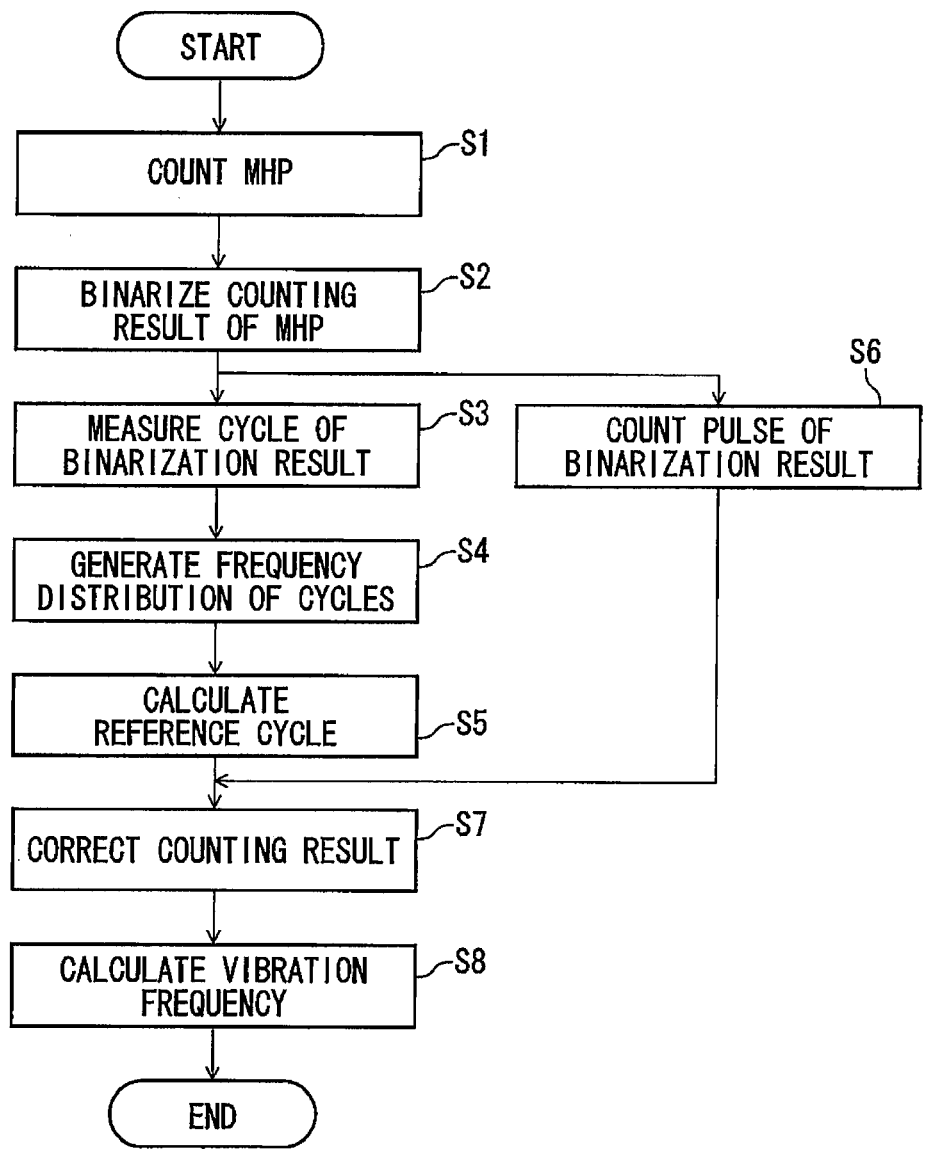
FIG. 5 is a flow chart showing operation of a counting device and a computing device according to the first embodiment of the present invention.

Next, operation of the counting device 7 and the computing device 8 will be described. FIG. 5 is a flow chart showing operation of the counting device 7 and the computing device 8.

Figure 6:
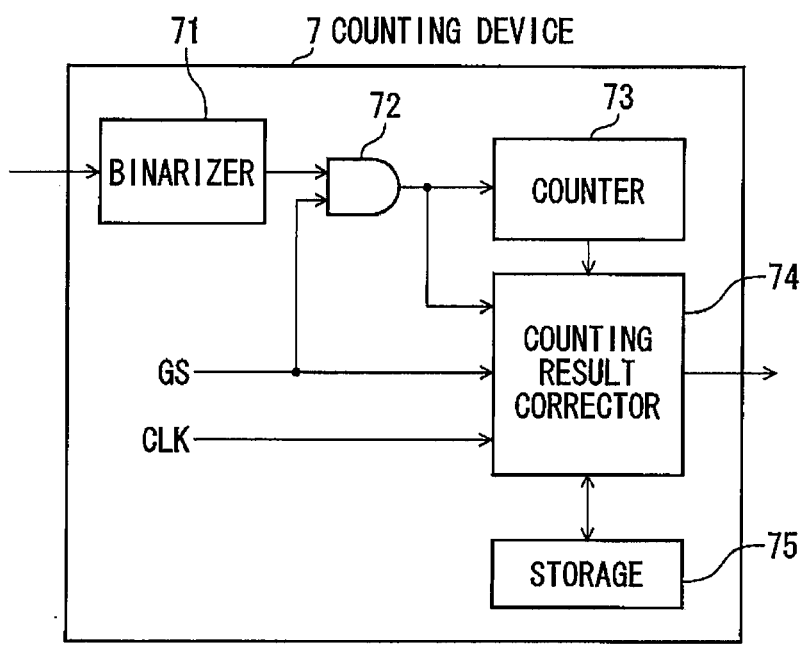
FIG. 6 is a block diagram showing one example of a configuration of the counting device according to the first embodiment of the present invention.

The counting device 7 counts the number of MHPs included in the output voltage of the filter 6 for the first oscillation period P1 and the second oscillation period P2 (Step S1 in FIG. 5). FIG. 6 is a block diagram showing one example of a configuration of the counting device 7. The counting device 7 includes a binarizer 71, an AND gate 72, a counter 73, a counting result corrector 74 and a storage 75. The transimpedance amplifier 5, the filter 6, the binarizer 71, the AND gate 72 and the counter 73, the latter 3 components of which are included in the counting device 7, constitute a signal counter.

Figure 7:
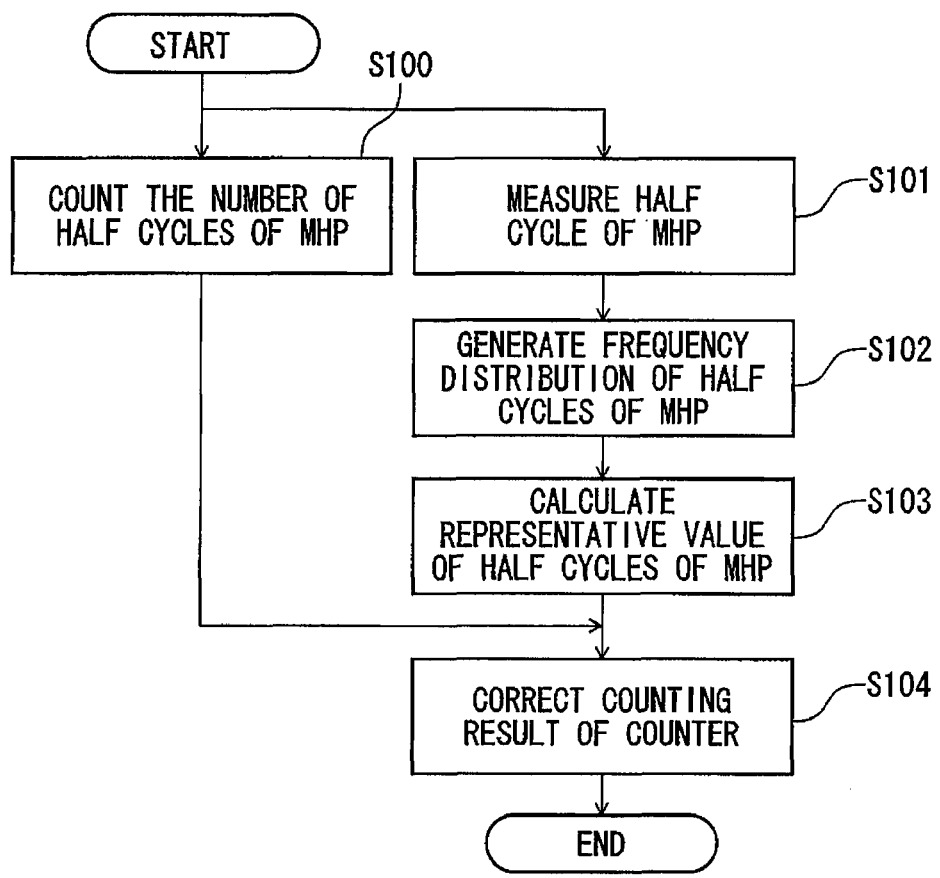
FIG. 7 is a flow chart showing operation of the counting device according to the first embodiment of the present invention.
Figure 8:
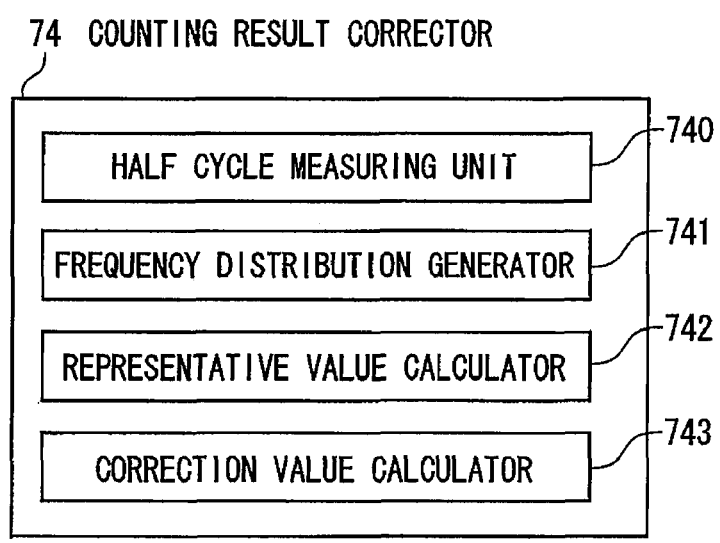
FIG. 8 is a block diagram showing one example of a configuration of a counting result corrector of the counting device according to the first embodiment of the present invention.

FIG. 7 is a flow chart showing the operation of the counting device 7 and FIG. 8 is a block diagram showing one example of a configuration of the counting result corrector 74. The counting result corrector 74 includes a half cycle measuring unit 740, a frequency distribution generator 741, a representative value calculator 742 and a correction value calculator 743.

Figure 9A:
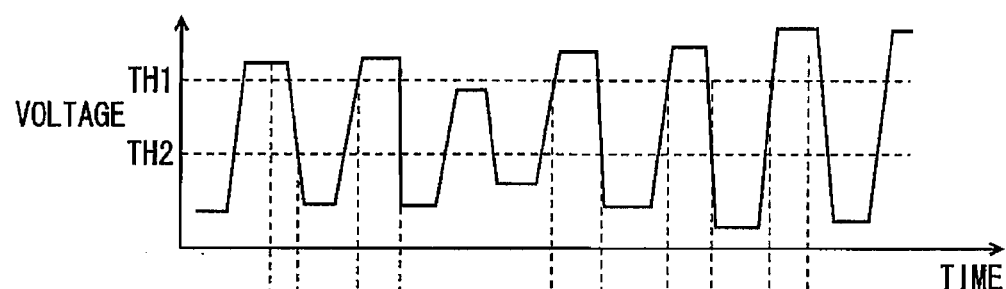
FIGS. 9A to 9D are views for explaining operation of a counter of the counting device according to the first embodiment of the present invention.
Figure 9B:
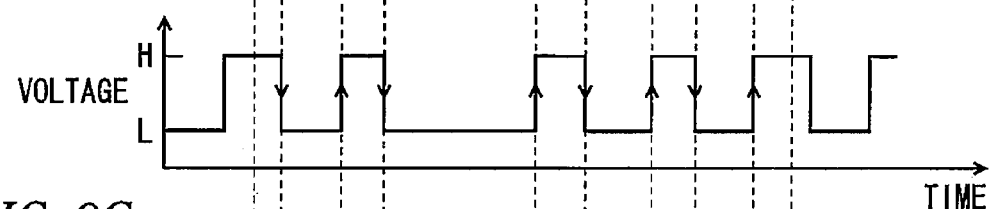
Figure 9C:
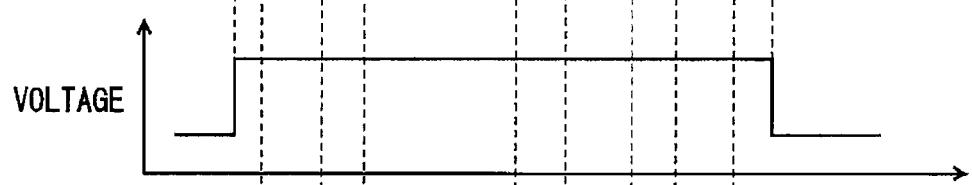
Figure 9D:
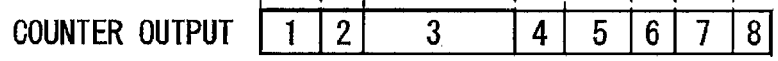

FIGS. 9A to 9D are views for explaining operation of the counter 73. FIG. 9A is a schematic view showing a waveform of the output voltage of the filter 6, that is, an MHP waveform, FIG. 9B is a view showing an output of the binarizer 71 corresponding to FIG. 9A, FIG. 9C is a view showing a gate signal GS input to the counting device 7 and FIG. 9D is a view showing a counting result of the counter 73 corresponding to FIG. 9B.

First, the binarizer 71 of the counting device 7 determines whether or not the output voltage of the filter 6 shown in FIG. 9A has a high level (H) or a low level (L) and outputs the result of the determination as shown in FIG. 9B. In this case, the binarizer 71 binarizes the output voltage of the filter 6 by determining that the output voltage of the filter 6 has the high level (H) if it rises above a threshold value TH1 and determining that the output voltage of the filter 6 has the low level (L) if it falls below a threshold value TH2 (TH2<TH1).

The AND gate 72 outputs a result of AND operation of an output of the binarizer 71 and the gate signal GS as shown in FIG. 9C and the counter 73 counts the number of rises/falls of the output of the AND gate 72 (FIG. 9D). Here, the gate signal GS is a signal which rises at the head of a counting period (the first oscillation period P1 or the second oscillation period P2 in this embodiment) and falls at the end of the counting period. Accordingly, the counter 73 counts the number of rising/falling edges (i.e., the number of half cycles of MHPs) of the output of the AND gate 72 during the counting period (Step S100 in FIG. 7).

Figure 10:
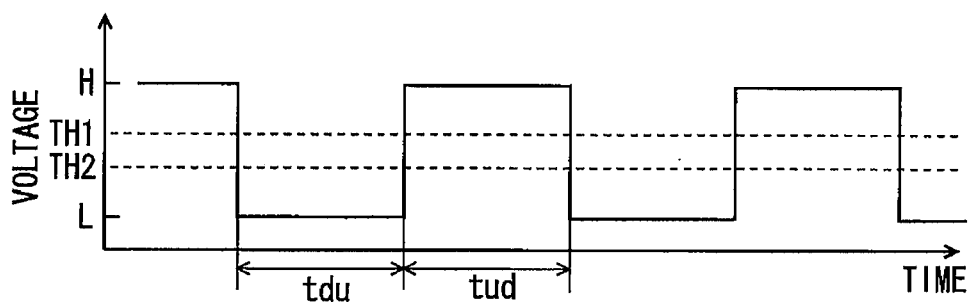
FIG. 10 is a view for explaining operation of a half cycle measuring unit of the counting device according to the first embodiment of the present invention.

FIG. 10 is a view for explaining operation of the half cycle measuring unit 740 of the counting result corrector 74. The half cycle measuring unit 740 measures half cycles of MHPs during the counting period (Step S101 in FIG. 7). Specifically, the half cycle measuring unit 740 detects the rise in the output of the AND gate 72 by comparing the output of the AND gate 72 during the counting period with a threshold value TH3, while detecting the fall in the output of the AND gate 72 by comparing the output of the AND gate 72 during the counting period with a threshold value TH4. Then, the half cycle measuring unit 740 measures the half cycle of the output of the AND gate 72 (that is, the MHP half cycle) during the counting period by measuring a period tud from the rising of the output of the AND gate 72 to the next falling and measuring a period tdu from the falling of the output of the AND gate 72 to the next rising. As such, the MHP half cycle refers to the period tud or tdu. The half cycle measuring unit 740 performs the above-mentioned measurement whenever one of the rising and falling of the output of the AND gate 72 is detected.

The storage 75 stores the counting result of the counter 73 and the measurement result of the half cycle measuring unit 740.

After the gate signal GS falls and the counting period expires, the frequency distribution generator 741 of the counting result corrector 74 generates a frequency distribution of the MHP half cycle during the counting period from the measurement result of the half cycle measuring unit 740 stored in the storage 75 (Step S102 in FIG. 7).

Subsequently, the representative value calculator 742 of the counting result corrector 74 calculates a representative value T0 of the MHP half cycle from the frequency distribution generated by the frequency distribution generator 741 (Step S103 in FIG. 7). Here, the mode, median or mean of the MHP half cycle may be taken as the representative value T0. Alternatively, the representative value calculator 742 may take a class value, which gives the maximum of the product of the class value and the frequency, as the representative value T0. Table 1 shows numerical examples of the frequency distribution and products of class values and frequencies in these numerical examples.

TABLE 1

Numerical examples of the frequency distribution

| Class value | 1 | 2 | 3 | 4 | 5 | 6 | 7 | 8 | 9 | 10 |
|---|---|---|---|---|---|---|---|---|---|---|
| Frequency | 11 | 2 | 0 | 3 | 7 | 10 | 6 | 2 | 3 | 1 |
| Product | 11 | 4 | 0 | 12 | 35 | 60 | 42 | 16 | 27 | 10 |

In the example of Table 1, the mode (class value) having the maximum frequency is 1. On the contrary, a class value giving the maximum of the product of the class value and the frequency is 6, which is different from the mode. The reason why the class value giving the maximum of the product of the class value and the frequency is taken as the representative value T0 will be described later. The representative value T0 calculated by the representative value calculator 742 is stored in the storage 75. The representative value calculator 742 performs such a calculation of the representative value T0 whenever the frequency distribution is generated by the frequency distribution generator 741.

The correction value calculator 743 of the counting result corrector 74 obtains the total sum Ns of the number of half cycles which are smaller than ½ of the representative value T0, and the total sum $Nw_n$ of the number of half cycles, which are equal to or larger than 2n times and smaller than (2n+2) times (n is a natural number equal to or larger than 1 and equal to or smaller than $n_{max}$) the representative value T0, from the measurement result of the half cycle measuring unit 740 and corrects the counting result of the counter 73 as expressed by the following equation (Step S104 in FIG. 7).

$$N' = \frac{1}{2}\left\{N - Ns + \sum_{n=1}^{n_{max}} (2n \times Nw_n)\right\} \quad (2)$$

$$n_{max} \leq \frac{T_{max}}{T0}$$

In Equation (2), N is the number of MHP half cycles, which is the counting result of the counter 73, N' is the number of MHPs obtained after correction, and $T_{max}$ is the maximum value which can be taken by the MHP half cycle. The principle of correcting the counting result of the counter 73 will be described later.

The counting device 7 performs the above-described process for the first oscillation period P1 and the second oscillation period P2.

Figure 11:
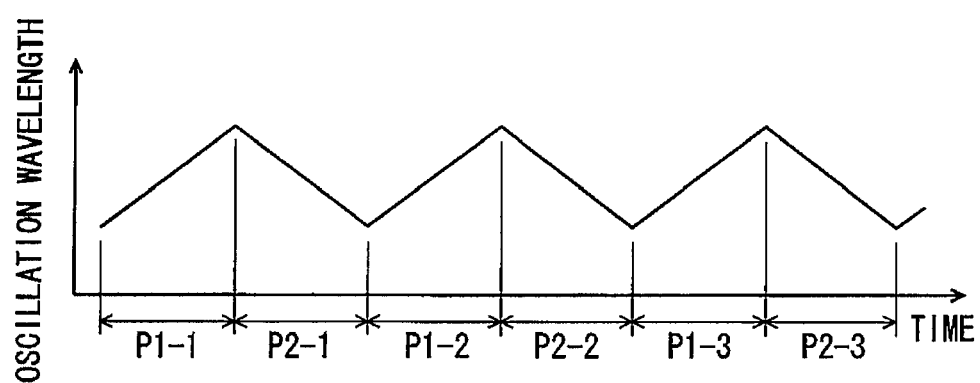
FIG. 11 is a view for explaining the relationship between a period during which a representative value calculator of the counting device calculates a representative value and a counting period of a correction object according to the first embodiment of the present invention.

In addition, the representative value T0 used by the correction value calculator 743 may use a value calculated from the measurement result of the half cycle measuring unit 740 in a counting period earlier by one cycle of a carrier wave (triangular wave) than a counting period of a correction object or may use a value calculated from the measurement result of the half cycle measuring unit 740 in the counting period for the correction object. FIG. 11 is a view for explaining the relationship between the period during which the representative value calculator 742 calculates the representative value T0 and the counting period of the correction object, showing a temporal change of the oscillation wavelength of the semiconductor laser 1.

When the correction value calculator 743 uses the representative value T0 calculated from the measurement result in the period earlier by one cycle of a carrier wave than the counting period of the correction object, it corrects the counting result of a first oscillation period P1-2 using the representative value T0 calculated in a first oscillation period P1-1, for example, shown in FIG. 11 and corrects the counting result of a second oscillation period P2-2 using the representative value T0 calculated in a second oscillation period P2-1. In addition, when the correction value calculator 743 uses the representative value T0 calculated from the measurement result in the counting period of the correction object, it corrects the counting result of the first oscillation period P1-1 using the representative value T0 calculated in the first oscillation period P1-1, for example, shown in FIG. 11 and corrects the counting result of the second oscillation period P2-1 using the representative value T0 calculated in the second oscillation period P2-1.

However, even when the representative value T0 calculated from the measurement result in the period of a carrier wave one cycle earlier than the counting period of the correction object is used, since an initial value of the representative value T0 in the first process does not exist, the counting result is corrected by obtaining the representative value T0 from the measurement result of the half cycle measuring unit 740 in the counting period of the correction object.

Figure 12:
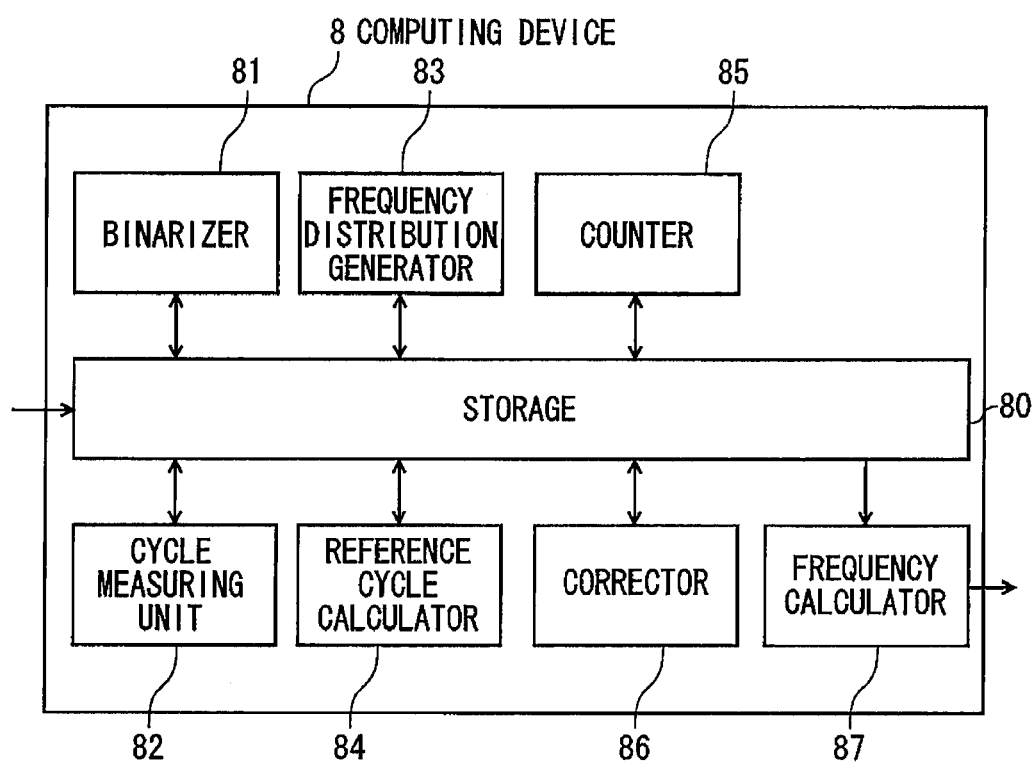
FIG. 12 is a block diagram showing one example of a configuration of the computing device according to the first embodiment of the present invention.

Next, the computing device 8 calculates the vibration frequency of the object 10 based on the number of MHPs counted by the counting device 7. FIG. 12 is a block diagram showing one example of a configuration of the computing device 8. The computing device 8 includes a storage 80 which stores the counting result of the counting device 7, and the like, a binarizer 81 which binarizes the counting result of the counting device 7, a cycle measuring unit 82 which measures a cycle of a binary output from the binarizer 81, a frequency distribution generator 83 which generates a frequency distribution of the cycle of the binary output, a reference cycle calculator 84 which calculates a reference cycle which is a representative value of the frequency distribution of the cycle of the binary output, a counter 85 which is a binary output counting unit for counting the number of pulses of the binary output, a corrector 86 which corrects the counting result of the counter 85, and a frequency calculator 87 which calculates the vibration frequency of the object 10 based on the corrected counting result.

Figure 13A:
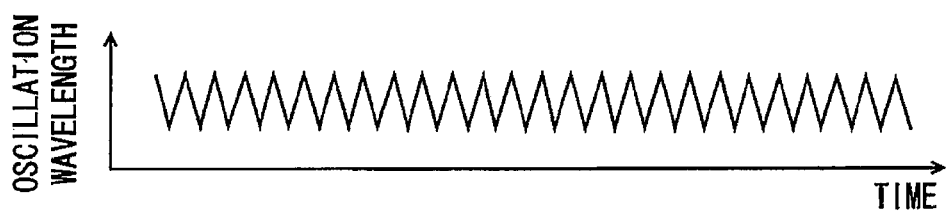
FIGS. 13A to 13C are views for explaining operation of a binarizer of the computing device according to the first embodiment of the present invention.
Figure 13B:
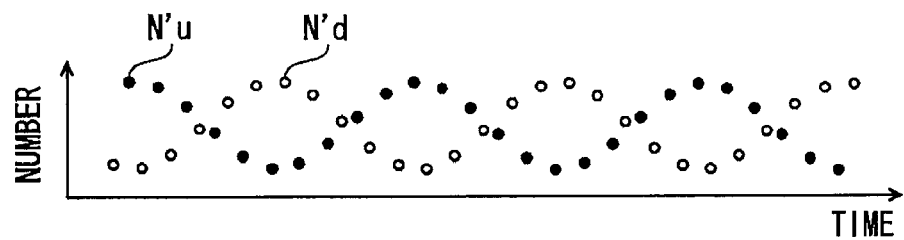
Figure 13C:
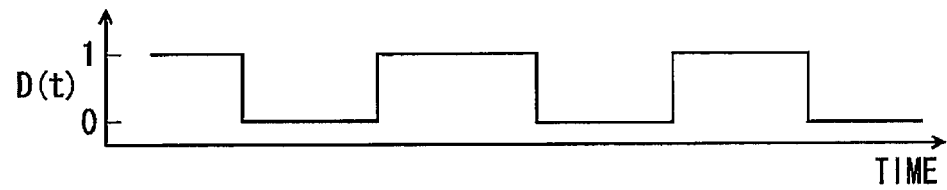

The counting result of the counting device 7 is stored in the storage 80 of the computing device 8. The binarizer 81 of the computing device 8 binarizes the counting result of the counting device 7, which was stored in the storage 80 (Step S2 in FIG. 5). FIGS. 13A to 13C are views for explaining operation of the binarizer 81. FIG. 13A is a view showing a temporal change of the oscillation wavelength of the semiconductor laser 1. FIG. 13B is a view showing the temporal change in the counting result of the counting device 7. FIG. 13C being a view showing an output D(t) of the binarizer 81. In FIG. 13B, N'u is the counting result of the first oscillation period P1 and N'd is the counting result of the second oscillation period P2.

The binarizer 81 compares the counting results, N'u and N'd, of the two oscillation periods P1 and P2, which are temporally adjacent to each other, and binarizes these counting results. Specifically, the binarizer 81 performs the following equations.

$$\text{If } N'u(t) \geq N'd(t-1) \text{ then } D(t)=1 \quad (3)$$

$$\text{If } N'u(t) < N'd(t-1) \text{ then } D(t)=0 \quad (4)$$

$$\text{If } N'd(t) \leq N'u(t-1) \text{ then } D(t)=1 \quad (5)$$

$$\text{If } N'd(t) > N'u(t-1) \text{ then } D(t)=0 \quad (6)$$

In Equations (3) to (6), (t) represents the number of MHPs measured at current time t and (t−1) represents the number of MHPs measured one period before the current time t. In Equations (3) and (4), the counting result at the current time t is the counting result N'u of the first oscillation period P1 and the counting result one period before the current time t is the counting result N'd of the second oscillation period P2. In this case, the binarizer 81 takes the output D(t) at the current time t as "1" (high level) if the counting result N'u(t) at the current time t is equal to or larger than the counting result N'd(t-1) one period before the current time t, and takes the output D(t) at the current time t as "0" (low level) if the counting result N'u(t) at the current time t is smaller than the counting result N'd(t−1) one period before the current time t.

In Equations (5) and (6), the counting result at the current time t is the counting result N'd of the second oscillation period P2 and the counting result one period before the current time t is the counting result N'u of the first oscillation period P1. In this case, the binarizer 81 takes the output D(t) at the current time t as "1" if the counting result N'd(t) at the current time t is equal to or smaller than the counting result N'u(t−1) one period before the current time t, and takes the output D(t) at the current time t as "0" if the counting result N'd(t) at the current time t is larger than the counting result N'u(t−1) one period before the current time t.

Thus, the counting results of the counting device 7 are binarized. The output D(t) of the binarizer 81 is stored in the storage 80. The binarizer 81 performs the above-described binarizing process each time at which the number of MHPs is measured by the counting device 7 (every oscillation period).

The binarization of the counting result of the counting device 7 means determination on displacement direction of the object 10. That is, if the counting result N'u when the oscillation wavelength of the semiconductor laser 1 increases is equal to or larger than the counting result N'd when the oscillation wavelength decreases (D(t)=1), the displacement direction of the object 10 is a direction in which the object 10 approaches the semiconductor laser 1. If the counting result N'u smaller than the counting result N'd (D(t)=0), the displacement direction of the object 10 is the direction in which the object 10 becomes further away from the semiconductor laser 1. Accordingly, essentially, if a cycle of the binarization output shown in FIG. 13C can be obtained, the vibration frequency of the object 10 can be calculated.

Figure 14:
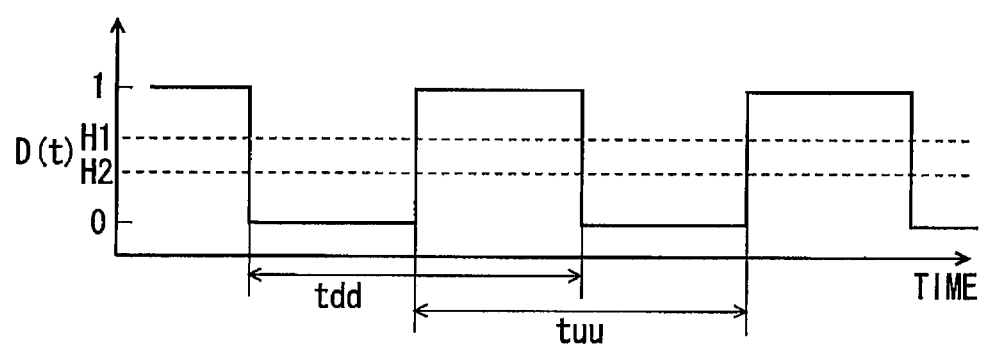
FIG. 14 is a view for explaining operation of a cycle measuring unit of the computing device according to the first embodiment of the present invention.

The cycle measuring unit 82 measures a cycle of the binarization output D(t) stored in the storage 80 (Step S3 in FIG. 5). FIG. 14 is a view for explaining operation of the cycle measuring unit 82. In FIG. 14, H1 is a threshold value used to detect a rise in the binarization output D(t) and H2 is a threshold value used to detect a fall in the binarization output D(t).

The cycle measuring unit 82 detects the rise in the binarization output D(t) stored in the storage 80 by comparing the binarization output D(t) with the threshold value H1 and measures the cycle of the binarization output D(t) by measuring a period tuu from the rise in the binarization output D(t) to the next rise thereof. The cycle measuring unit 82 performs such a measurement whenever a rising edge occurs in the binarization output D(t).

Alternatively, the cycle measuring unit 82 may detect the fall in the binarization output D(t) stored in the storage 80 by comparing the binarization output D(t) with the threshold value H2 and measure the cycle of the binarization output D(t) by measuring a period tdd from the fall in the binarization output D(t) to the next fall thereof. The cycle measuring unit 82 performs such measurement whenever a falling edge occurs in the binarization output D(t).

Figure 15:
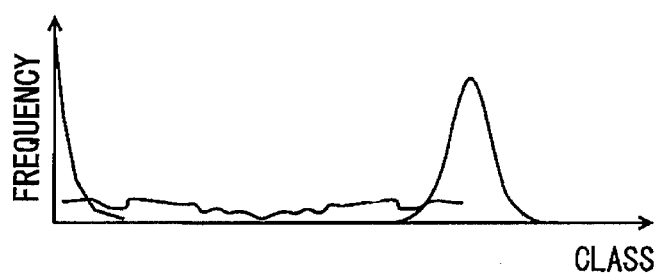
FIG. 15 is a view showing one example of frequency distribution of a cycle of a binarization output produced by binarizing a counting result of the counting device according to the first embodiment of the present invention.

A measurement result of the cycle measuring unit 82 is stored in the storage 80. Next, the frequency distribution generator 83 generates a frequency distribution of cycles for a certain period of time T (T>Tt, for example, 100×Tt, i.e., a period corresponding to 100 triangular waves) from the measurement result of the cycle measuring unit 82 (Step S4 in FIG. 5). FIG. 15 is a view showing one example of the frequency distribution. The frequency distribution generated by the frequency distribution generator 83 is stored in the storage 80. The frequency distribution generator 83 generates such a frequency distribution every period T.

Subsequently, the reference cycle calculator 84 calculates a reference cycle Tr, which is the representative value of the cycles of the binarization output D(t), from the frequency distribution generated by the frequency distribution generator 83 (Step S5 in FIG. 5). A representative value of cycles is generally the mode or median, however, in this embodiment, the mode or median is inappropriate as the representative value of cycles. Therefore, the reference cycle calculator 84 takes a class value giving the maximum product of the class value and the frequency as the reference cycle Tr. The reason for taking the class value giving the maximum product of the class value and the frequency as the reference cycle Tr will be described later. A value of the calculated reference cycle Tr is stored in the storage 80. The reference cycle calculator 84 performs calculation of such a reference cycle Tr whenever the frequency distribution is generated by the frequency distribution generator 83.

In the meantime, the counter 85 operates in parallel to the cycle measuring unit 82 and the frequency distribution generator 83 and counts the number Na of rising edges of the binarization output D(t) (i.e., the number of pulses of "1" of the binarization output D(t)) for the same period T as a period which is a target of the frequency distribution generation by the frequency distribution generator 83 (Step S6 in FIG. 5). The counting result Na of the counter 85 is stored in the storage 80. The counter 85 performs such a counting of the binarization output D(t) every period T.

The corrector 86 obtains the total sum Nsa of frequencies of classes, which are equal to or smaller than ½ of the reference cycle Tr, and the total sum Nwa of frequencies of classes, which are equal to or larger than 1.5 times the reference cycle Tr, from the frequency distribution generated by the frequency distribution generator 83, and corrects the counting result Na of the counter 85 as follows (Step S7 in FIG. 5).

$$Na'=Na-Nsa+Nwa' \qquad (7)$$

In Equation (7), Na' is a corrected counting result. The corrected counting result Na' is stored in the storage 80. The corrector 86 performs such correction every period T.

Figure 16:
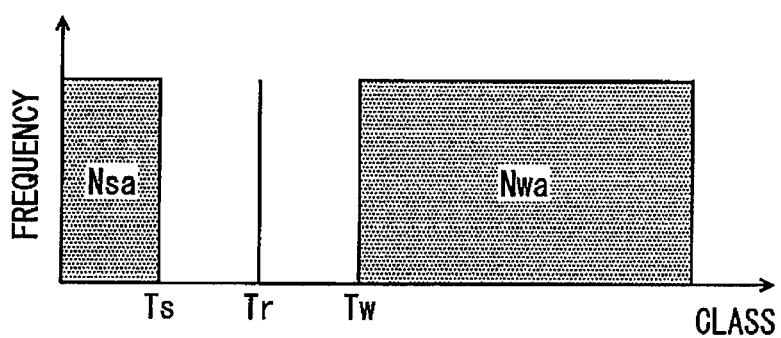
FIG. 16 is a schematic view showing the frequency used for correction of a counting result of a counter of the computing device according to the first embodiment of the present invention.

FIG. 16 is a schematic view showing the total sums Nsa and Nwa of frequencies. In FIG. 16, Ts is a class value of ½ of the reference cycle Tr and Tw is class value of 1.5 times the reference cycle Tr. Of course, the classes shown in FIG. 16 are representative values of cycles. In FIG. 16, frequency distributions between the reference cycle Tr and Ts and between the reference cycle Tr and Tw are omitted for the purpose of brevity of description.

Figure 17A:
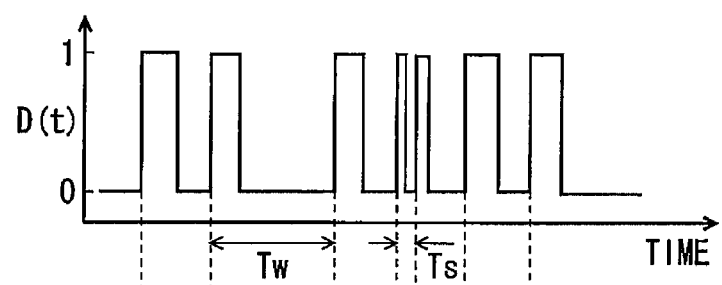
FIGS. 17A and 17B are views for explaining the principles of correcting the counting result of the counter of the computing device according to the first embodiment of the present invention.
Figure 17B:

FIGS. 17A and 17B are views for explaining the principle of correcting the counting result of the counter 85. FIG. 17A is a view showing the binarization output D(t) and FIG. 17B is a view showing the counting result of the counter 85 corresponding to FIG. 17A.

Although the cycle of the binarization output D(t) generally depends on the vibration frequency of the object 10, pulses of the binarization output D(t) appear with the same cycle. If the vibration frequency of the object 10 is invariable, however, an MHP waveform may be deficient or include waveforms, which must not be counted as signals, due to noises. As a result, the waveform of the binarization output D(t) may also be deficient or include waveforms which must not be counted as signals, which may result in an erroneous counting result of pulses of the binarization output D(t).

If such a signal deficiency occurs, the cycle Tw of the binarization output D(t) at a site where the deficiency occurs is approximately two times as large as the original cycle. That is, if the cycle of the binarization output D(t) is equal to or larger than approximately two times the reference cycle Tr, then it may be determined that the signal is deficient. Therefore, assuming that the total sum Nwa of frequencies of classes which are equal to or larger than the cycle Tw is the number of deficiencies of the signal, such signal deficiency may be corrected by adding Nwa to the counting result Na of the counter 85.

In addition, the cycle Ts of the binarization output D(t) at a site where an original signal is divided due to a spike noise or the like has two signals, i.e., a signal having a cycle smaller by ½ than the original cycle and a signal having a cycle larger by ½ than the original cycle. That is, if the cycle of the binarization output D(t) is equal to or smaller than about ½ of the reference cycle Tr, then it may be determined that the signal has been excessively counted. Therefore, assuming that the total sum Nsa of frequencies of classes which are equal to or smaller than the cycle Ts is the number of excessive signal counts, noises erroneously counted may be corrected for by subtracting Nsa from the counting result Na of the counter 85. Such are the principles of correcting the counting result shown in Equation (7).

The frequency calculator 87 calculates the vibration frequency fsig of the object 10 based on the corrected counting result N' calculated by the corrector 86, as follows (Step S8 in FIG. 5).

$$Fsig=Na'/T \qquad (8)$$

The display 9 displays a value of the vibration frequency fsig calculated by the computing device 8.

Here, the principle of correcting the counting result of the counter 73 of the counting device 7 will be described. The correction of the counting result shown in Equation (2) has the same basic principle as the correction of the counting result shown in Equation (7). However, according to the correction principle disclosed in JP-A-2009-47676, if a burst noise having a frequency higher than that of MHP is mixed into a signal input to the counting device, the counting result of the counter 73 may not be properly corrected. In particular, the number of samplings in a vibration frequency measurement may take only a period corresponding to several times or so the vibration frequency, and accordingly, a small counting error may result in a large frequency error. Hereinafter, related-art problems will be described with an example of a vibration frequency measurement.

Figure 18A:
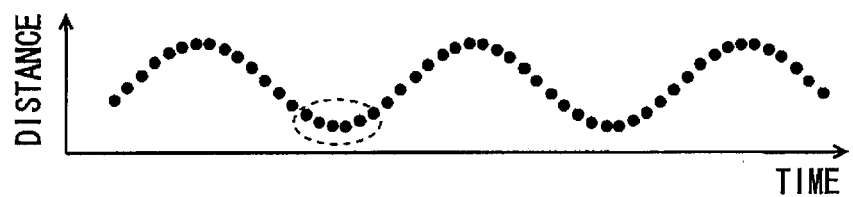
FIGS. 18A to 18D are views for explaining problems of a related-art counting device.
Figure 18B:
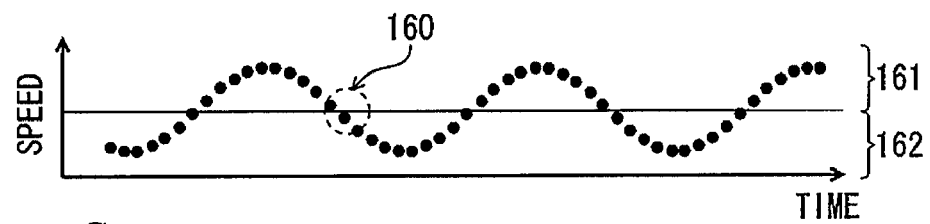
Figure 18C:
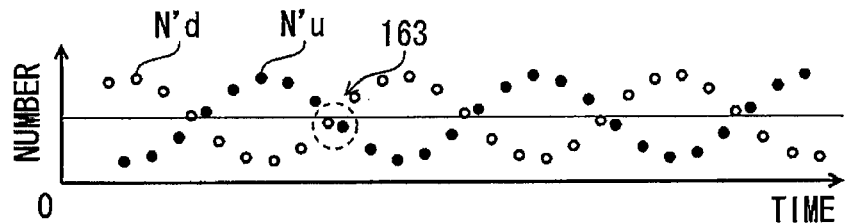
Figure 18D:
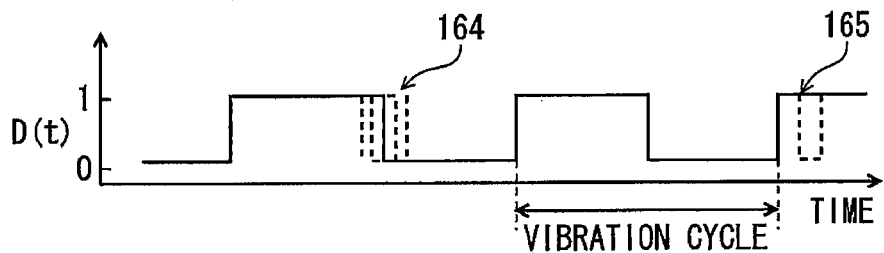

FIGS. 18A to 18D are provided to explain problems of the related-art counting device disclosed in JP-A-2009-47676. FIG. 18A is a view showing the temporal change in the distance to the object 10, FIG. 18B is a view showing a temporal change of a speed of the object 10, FIG. 18C is a view showing a temporal change of the counting result of the counting device and FIG. 18D is a view showing the binarization output D(t) generated by binarizing the counting result of the counting device. In FIG. 18B, reference numeral 160 denotes a site having a low speed, reference numeral 161 denotes a direction in which the object 10 approaches the semiconductor laser 1, and reference numeral 162 denotes a direction in which the object 10 gets far away from the semiconductor laser 1. In addition, although FIGS. 18A to 18D shows a case where the ratio of the maximum speed of the vibration of the object 10 to a distance to the object 10 is smaller than a change rate of wavelength of the semiconductor laser 1 in this embodiment, since the related-art counting device has the same signal waveform as the inventive counting device, problems of the related-art counting device will be described with reference to FIGS. 18A to 18D.

As shown in FIG. 18C, if noise having a frequency higher than MHP is introduced in a site 163 having a low speed of the object 10, a magnitude relationship between the counting results N'u and N'd may be the reverse of the original relationship. As a result, as shown in FIG. 18D, at a site 164 where the sign of the binarization output D(t) is changed, the sign of the binarization output D(t) may have a value inverse to the original value.

Figure 19:
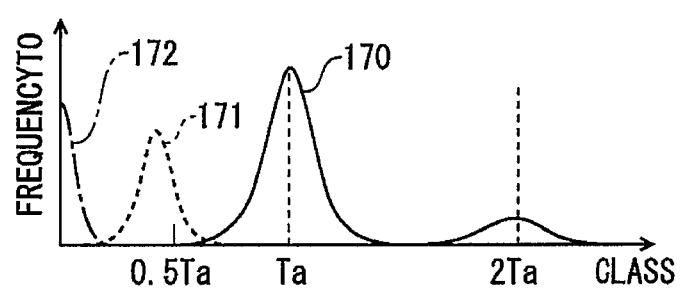
FIG. 19 is a view showing one example of frequency distribution of a cycle of a mode hop pulse when high frequency noise is mixed to a signal input to the counting device.

In a case where MHP is binarized with a threshold value, at a site when MHP takes a value close to the threshold value, since the sign is likely to be inverted due to noise having a high frequency and the site where the sign is likely to be inverted exists every ½ cycle of MHP, the frequency distribution of MHP cycles includes a distribution 171 having the maximum value of frequencies with a cycle which is about half of the original cycle Ta of MHP, and a cycle 172 having a short noise, in addition to a distribution 170 having the maximum value of frequencies with the original cycle Ta of MHP, as shown in FIG. 19. In addition, the maximum value of their frequencies tends to shift to a class having a slight short period due to mixed noise with a high frequency. In addition, in some cases noise with a high frequency may be continuously mixed in. In the related-art counting device disclosed in JP-A-2009-47676, when such continuous high frequency noise is mixed, the counting result of MHP cannot be sufficiently corrected.

Figure 20:
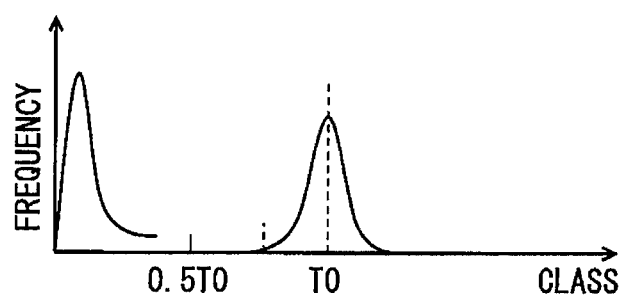
FIG. 20 is a view showing one example of a frequency distribution of a half cycle of the mode hop pulse.

In this embodiment, the counting result is corrected using not a representative value Ta of cycles of MHP but a representative value T0 of half cycles. FIG. 20 shows an example of a frequency distribution of half cycles of MHP. As can be seen from FIG. 20, when the frequency distribution of half cycles of MHP is obtained, the maximum value of frequencies does not appear near 0.5 T0 even when high frequency noise is mixed in a signal input to the counting device 7. That is, since the maximum value of frequencies near a threshold value to obtain the total sum Ns of the number of half cycles which is less than ½ of the representative value T0 disappears, the Ns can be properly obtained to suppress an error of correction. Such are the principles of correcting the counting result shown in Equation (2). In addition, the reason for halving the right side of Equation (2) is to convert the number of half cycles of MHP into the number of MHPs.

As described above, in this embodiment, by counting the number of half cycles of MHPs during the counting period by unit of the counter 73, measuring the half cycle of MHPs during the counting period, generating the frequency distribution of the half cycle of MHPs during the counting period from this measurement result, calculating the representative value T0 of the half cycles of MHPs from the frequency distribution, obtaining the total sum Ns of the number of half cycles which are smaller than ½ of the representative value T0, and the total sum $Nw_n$ of the number of half cycles, which are equal to or larger than 2n times and smaller than (2n+2) times the representative value T0, and correcting the counting result of the counter 73 based on the frequencies Ns and $Nw_n$, since a counting error of MHPs can be corrected with high precision even when noise having a frequency higher than that of MHP continuously occurs in a signal input to the counting device, it is possible to improve the measurement precision of the vibration frequency of the object 10.

In addition, in this embodiment, by binarizing the counting result of MHPs by comparing magnitudes of the counting results of the first and second oscillation periods P1 and P2 temporally adjacent to each other, generating the frequency distribution of cycles for a certain period of time T by measuring the cycles of the binarization output D(t), calculating the reference cycle Tf, which is the representative value of the distribution of the cycles of the binarization output D(t), from the frequency distribution of cycles, counting the number of pulses of the binarization output D(t) for the certain period of time T, obtaining the total sum Nsa of frequencies of classes which are equal to or smaller than ½ of the reference cycle Tr and the total sum Nwa of frequencies of classes which are equal to or larger than 1.5 times the reference cycle Tr from the frequency distribution, and correcting the counting result of the pulses of the binarization output D(t) based on these frequencies Nsa and Nwa, since a counting error of the binarization output D(t) can be corrected, it is possible to improve the measurement precision of the vibration frequency of the object 10.

Next, the reason why the reference cycle calculator 84 takes a class value giving the maximum product of the class value and the frequency as the reference cycle Tr will be described.

For a self-coupling type laser measurement device using a wavelength modulation (triangular wave modulation in this embodiment), the number of MHPs for each counting period is the sum of or the difference between the number of MHPs which is proportional to the distance to the object 10 and the number of MHPs which is proportional to a displacement (speed) of the object 10 for the counting period. According to a magnitude relationship between the ratio of the maximum speed of vibration of the object 10 to the distance to the object 10 and a rate of change of a wavelength of the semiconductor laser 1, a signal obtained by the measurement device may be classified into two conditions as follows.

First, a case where the ratio of the maximum speed of vibration of the object 10 to the distance to the object 10 is smaller than the rate of change of the wavelength of the semiconductor laser 1 will be described with reference to FIGS. 18A to 18D. If the ratio of the maximum speed of vibration of the object 10 to the distance to the object 10 is smaller than the rate of change of the wavelength of the semiconductor laser 1, since the number of MHPs which is proportional to the distance to the object 10 is always larger than the number of MHPs which is proportional to the displacement (speed) of the object 10 for the counting period, the absolute value of the difference between the counting result N'u when the oscillation wavelength of the semiconductor laser 1 increases and the counting result N'd when the oscillation wavelength decreases is always proportional to the displacement of the object 10 for two counting periods (the oscillation periods P1 and P2 in this embodiment). In this case, a plot of N'u−N'd in a time-series shows the speed of vibration with the approach direction to the semiconductor laser 1 as the positive direction. Accordingly, the sign of N'u−N'd represents the movement direction of the object 10 and the displacement of the object 10 can be binarized using this sign.

Figure 21:
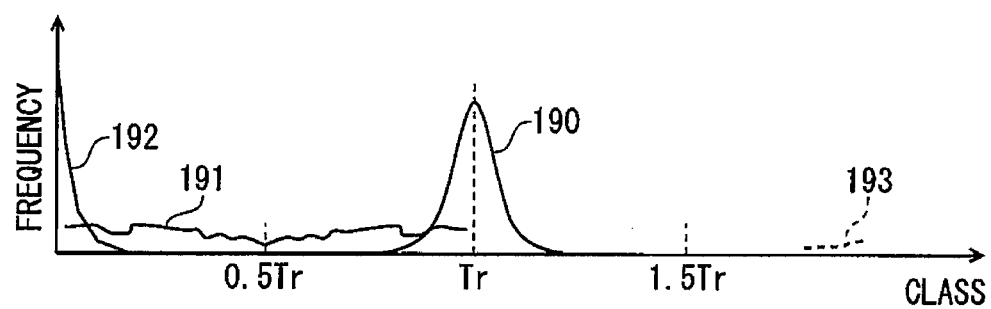
FIG. 21 is a view showing a frequency distribution of a cycle generated according to the binarization output shown in FIG. 18.

At this time, the frequency distribution of cycles generated by the frequency distribution generator 83 is as shown in FIG. 21.

If white noise, which may be caused by, for example, disturbance light or the like, is applied to the site 163 having a low speed of the object 10 as shown in FIG. 18C, the sign of the binarization output D(t) may have a value inverse to the original value at the site 164 where the sign of the binarization output D(t) is changed. In addition, if spike noise, which may be caused by, for example, disturbance light or the like, is applied, the sign of the binarization output D(t) is locally changed at the site 165 as shown in FIG. 18D.

As a result, the frequency distribution of cycles generated by the frequency distribution generator 83 becomes the sum of a normal distribution 190 with the reference cycle Tr as the center, a frequency 191 by sign inversion due to spike noise, and a frequency 192 by sign inversion due to white noise, as shown in FIG. 21. In addition, a frequency 193 of sign deficiency when the binarization is performed does not frequently appear as long as low frequency noise with a high speed is not mixed.

Figure 22A:
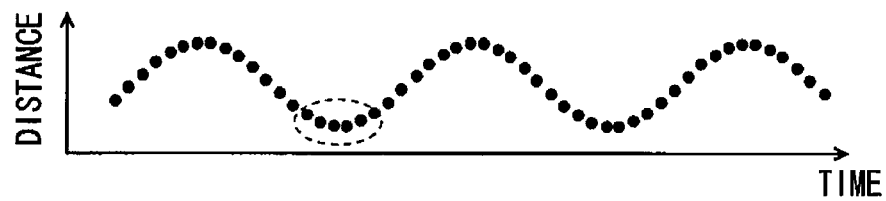
FIGS. 22A to 22D are views for explaining signals obtained by the vibration frequency measurement device according to the first embodiment of the present invention when a ratio of the maximum rate of vibration of an object to a distance to the object is larger than a rate of change in a wavelength of a semiconductor laser.
Figure 22B:
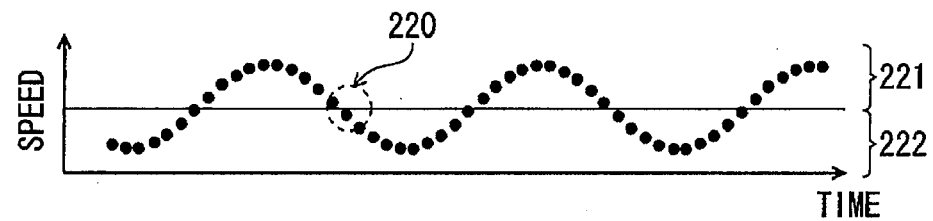
Figure 22C:
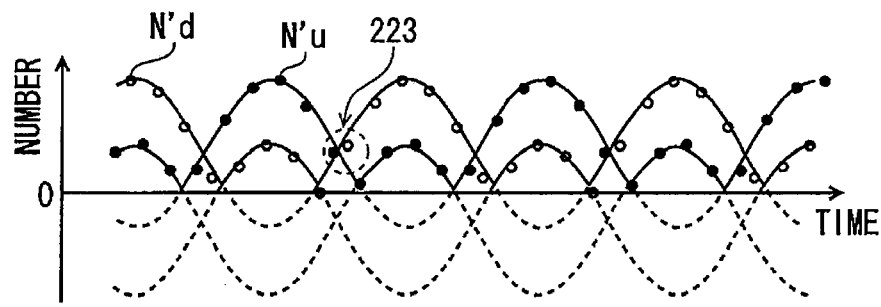

Next, a case where the ratio of the maximum speed of vibration of the object 10 to the distance to the object 10 is larger than the rate of change of the wavelength of the semiconductor laser 1 will be described. FIGS. 22A to 22D are views to explain signals obtained by the vibration frequency measurement device according to this embodiment, FIG. 22A being a view showing a temporal change in the distance to the object 10, FIG. 22B being a view showing a temporal change of a speed of the object 10, FIG. 22C being a view showing a temporal change of the counting result of the counting device 7 and FIG. 22D being a view showing the binarization output D(t) generated by the binarizer 81. In FIG. 22B, reference numeral 220 denotes a site having a low speed, reference numeral 221 denotes a direction in which the object 10 approaches the semiconductor laser 1, and reference numeral 222 denotes a direction in which the object 10 gets far away from the semiconductor laser 1.

If the ratio of the maximum speed of vibration of the object 10 to the distance to the object 10 is larger than the rate of change of the wavelength of the semiconductor laser 1, since the number of MHPs which is proportional to the distance to the object 10 becomes smaller than the number of MHPs which is proportional to the displacement (speed) of the object 10 for the counting period near the maximum speed of the object 10, there exist a period in which the difference between the counting result N'u when the oscillation wavelength of the semiconductor laser 1 increases and the counting result N'd when the oscillation wavelength decreases is proportional to the displacement of the object 10 for two counting periods (the oscillation periods P1 and P2 in this embodiment) and a period in which the sum of the counting result N'u and the counting result N'd is proportional to the displacement of the object 10 for the two counting periods.

In this case, the speed of vibration of the object 10 can be expressed by composition of graphs which plot N'u−N'd and N'u+N'd in a time-series, as shown in FIG. 22B. Here, since the direction of the speed always matches the magnitude relationship between N'u and N'd, the sign of N'u−N'd represents the movement direction of the object 10 and the displacement of the object 10 can be binarized using this sign.

Figure 22D:
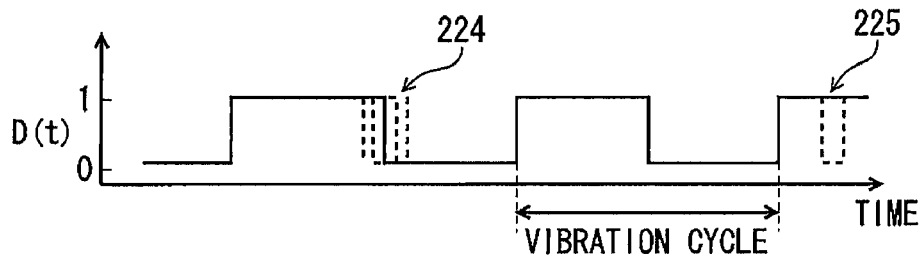

Like the case where the ratio of the maximum speed of vibration of the object 10 to the distance to the object 10 is smaller than the rate of change of the wavelength of the semiconductor laser 1, if white noise, which may be caused by, for example, disturbance light or the like, is applied to a site 223 having a low speed of the object 10, the sign of the binarization output D(t) may have a value inverse to the original value at a site 224 where the sign of the binarization output D(t) is changed. In addition, if spike noise, which may be caused by, for example, disturbance light or the like, is applied, the sign of the binarization output D(t) is locally changed at a site 225 as shown in FIG. 22D. At this time, the frequency distribution of cycles generated by the frequency distribution generator 83 is as shown in FIG. 21.

In correcting the binarization output D(t) generated by binarizing the displacement of the object 10 as in this embodiment, correction of high frequency noise is important. A change of sign in a short period, which may be caused by high frequency noise, may exceed the frequency of cycles of inherent vibration of the object 10, or, if the mode, the median or the like is used as a representative value of cycles, a correction may be applied by mistake on the basis of a noise cycle shorter than the vibration cycle. Accordingly, for a certain period of time T for calculating a vibration frequency, a correction on the counting result of the counter 85 is performed with a class value giving the highest percentage of occupation of a signal having a class, i.e., the maximum product of the class value and the frequency, as the reference cycle Tr. Such are the reason why a class value giving the maximum product of the class value and the frequency is taken as the reference cycle Tr.

This reason for taking a class value giving the maximum product of the class value and the frequency as the reference cycle Tr is equally applied to the representative value calculator 742. That is, in a case where high frequency noise exists, it is more advantageous to take a class value giving the highest percentage of occupation of a signal having a class as the representative value T0 for a counting period, rather than using the mode or the median as the representative value T0.

In addition, as another example of this embodiment, the technique for correcting the counting result of the counter 73 may be applied to a technique for correcting the counting result of the counter 85.

[Second Embodiment]

Figure 23:
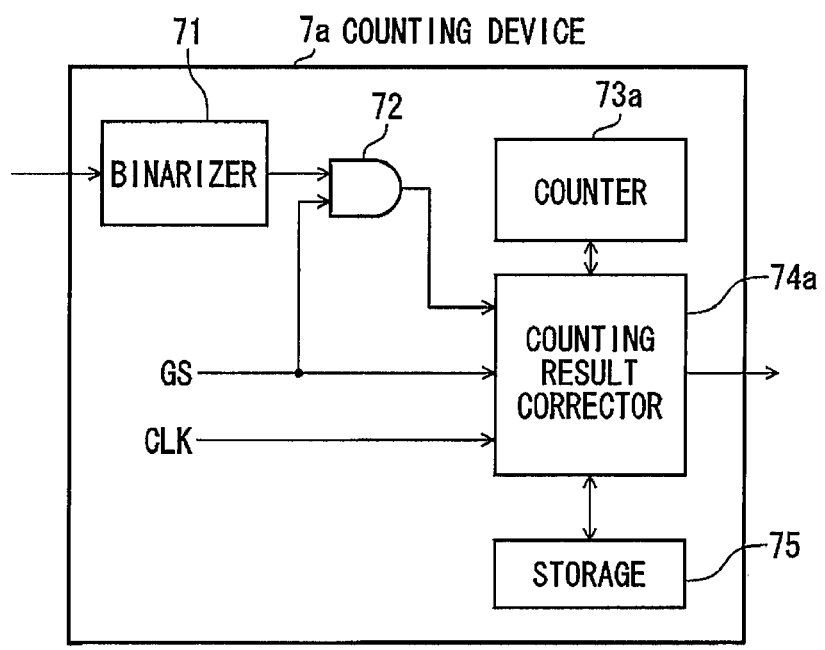
FIG. 23 is a block diagram showing one example of a configuration of a counting device according to a second embodiment of the present invention.

Next, a second embodiment of the present invention will be described. FIG. 23 is a block diagram showing one example of a configuration of a counting device according to this embodiment. This embodiment uses a counting device 7a instead of the counting device 7 of the first embodiment. The counting device 7a includes a binarizer 71, an AND gate 72, a counter 73a, a counting result corrector 74a and a storage 75.

Figure 24:
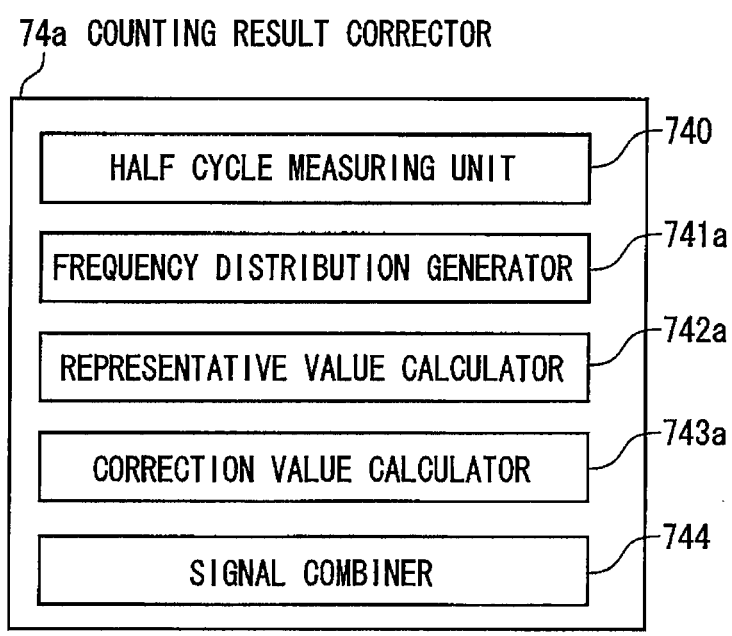
FIG. 24 is a block diagram showing one example of a configuration of a counting result corrector of the counting device according to the second embodiment of the present invention.

FIG. 24 is a block diagram showing one example of a configuration of the counting result corrector 74a of this embodiment. The counting result corrector 74a includes a half cycle measuring unit 740, a frequency distribution generator 741a, a representative value calculator 742a, a correction value calculator 743a and a signal combiner 744.

Figure 25:
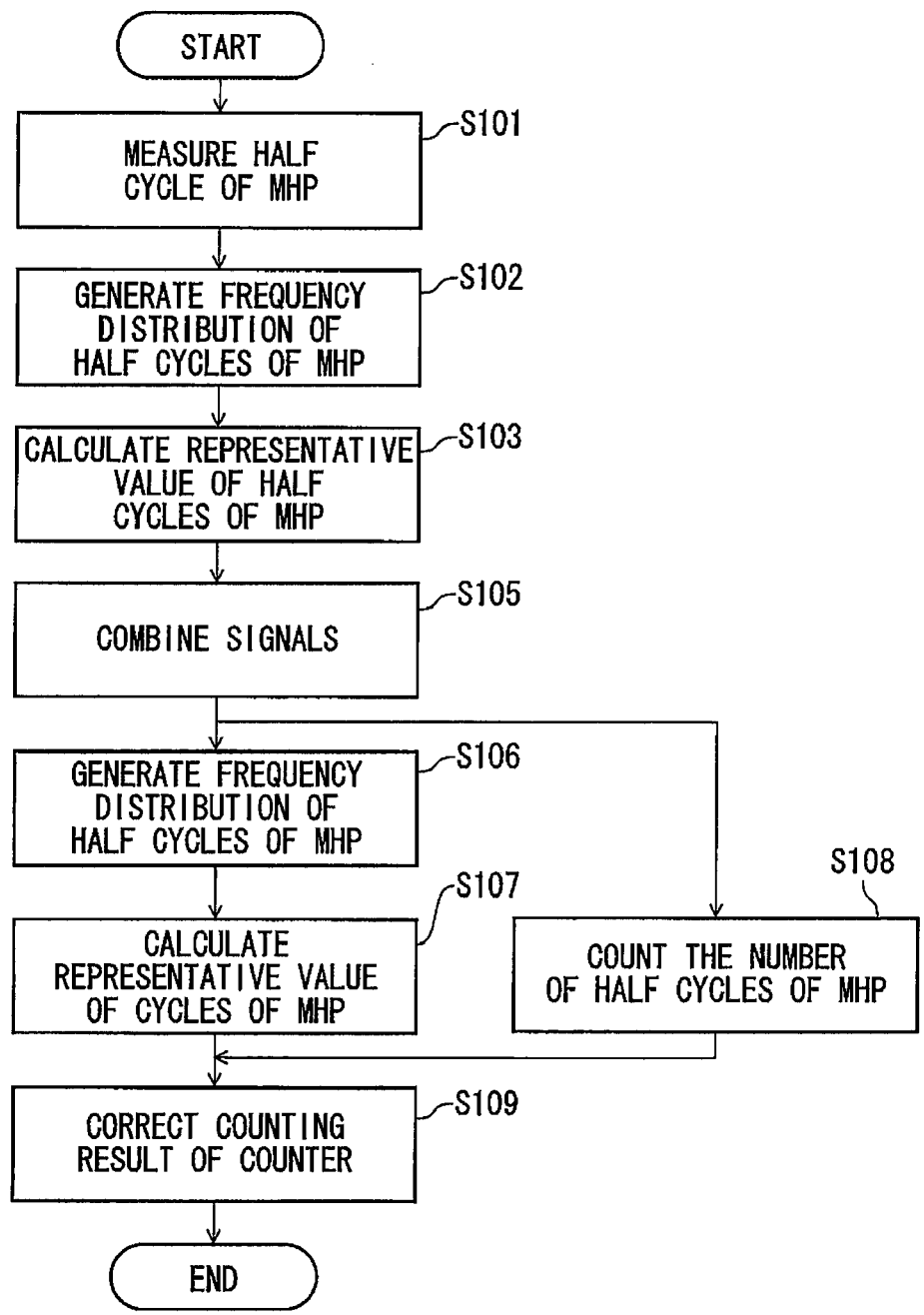
FIG. 25 is a flow chart showing operation of the counting device according to the second embodiment of the present invention.

FIG. 25 is a flow chart showing operation of the counting device 7a according to this embodiment. As described in the first embodiment, the half cycle measuring unit 740 measures half cycles of MHPs during a counting period (Step S101 in FIG. 25).

Like the first embodiment, the frequency distribution generator 741a generates a frequency distribution of the half cycles of MHPs during the counting period from the measurement result of the half cycle measuring unit 740 stored in the storage 75 (Step S102 in FIG. 25).

Like the first embodiment, the representative value calculator 742a calculates a representative value T0 of the MHP half cycle from the frequency distribution generated in Step S102 by the frequency distribution generator 741a (Step S103 in FIG. 25). Like the first embodiment, the mode, median or mean of the MHP half cycle may be taken as the representative value T0, or alternatively, a class value giving the maximum of the product of the class value and the frequency may be taken as the representative value T0. The representative value T0 calculated by the representative value calculator 742a is stored in the storage 75.

Figure 26A:
FIGS. 26A to 26C are views for explaining operation of a signal combiner of the counting device according to the second embodiment of the present invention.
Figure 26B:
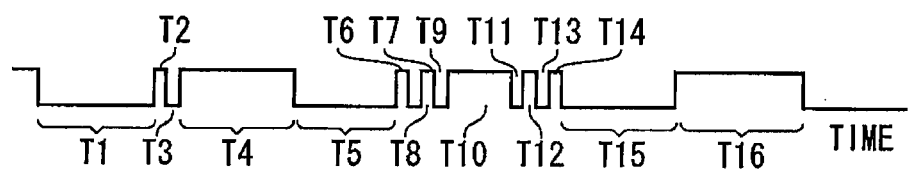
Figure 26C:
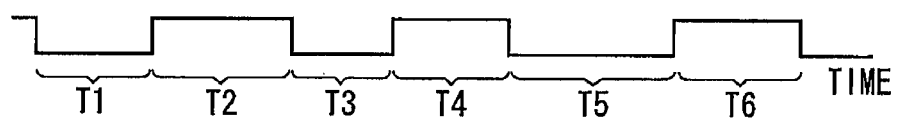

Next, for the measurement result of the half cycle measuring unit 740, the signal combiner 744 performs a process of taking a cycle, which is a combination of a half cycle smaller than ½ of the representative value T0 and a half cycle measured immediately thereafter, as a half cycle after combination and taking a waveform generated by combining cycles as a waveform corresponding to a half cycle of one MHP, until the half cycle after combination reaches ½ or more of the representative value T0 (Step S105 in FIG. 25). FIGS. 26A to 26C are provided to explain operation of the signal combiner 744. FIG. 26A is a schematic view showing an MHP waveform, FIG. 26B is a view showing a measurement result of the half cycle measuring unit 740 and FIG. 26C is a view showing the processing result of the signal combiner 744.

When the half cycle measuring unit 740 measures an MHP half cycle shown in FIG. 26A, measurement results, which are half cycles T1 to T16, are obtained as shown in FIG. 26B. Among them, the half cycles T2, T3, T6 to T9 and T11 to T14 are caused by high frequency noise or the like. In this case, since the half cycles T2, T3 and T6 to T14 are smaller than ½ of the representative value T0, T10 is not recognized as the MHP half cycle in the counting device 7 of the first embodiment, which causes an error in the counting result.

On the contrary, in the second embodiment, when the signal combiner 744 performs a combination process of the above signals, processing results, which are the half cycles T1 to T6, are obtained as shown in FIG. 26C. For example, a cycle which is a combination of the half cycles T2 to T4 becomes the half cycle T2 after combination and waveforms of T2 to T4 are combined into a waveform corresponding to one MHP half cycle. Similarly, a cycle which is a combination of the half cycles T6 to T10 becomes the half cycle T4 after combination and waveforms of T6 to T10 are combined into a waveform corresponding to one MHP half cycle. The processing results of the signal combiner 744 are stored in the storage 75.

Next, the frequency distribution generator 741a generates a frequency distribution of the half cycles of MHPs during the counting period from the processing results of the signal combiner 744 stored in the storage 75 (Step S106 in FIG. 25).

Subsequently, the representative value calculator 742a calculates the representative value T0 of the MHP half cycles from the frequency distribution generated in Step S106 by the frequency distribution generator 741a (Step S107 in FIG. 25).

Accordingly, the representative value T0 stored in the storage 75 is updated as the newest value calculated in Step S107. Like the first embodiment, the mode, median or mean of the MHP half cycles may be taken as the representative value T0, or alternatively, a class value giving the maximum of the product of the class value and the frequency may be taken as the representative value T0.

In the meantime, the counter 73a counts the number of half cycles of the MHPs processed by the signal combiner 744 (Step S108 in FIG. 25).

Finally, the correction value calculator 743a obtains the total sum Ns of the number of half cycles, which are smaller than ½ of the representative value T0, and the total sum $Nw_n$ of the number of half cycles, which are equal to or larger than 2n times and smaller than (2n+2) times (n is a natural number equal to or larger than 1 and equal to or smaller than $n_{max}$) the representative value T0, from the processing results of the signal combiner 744 and corrects the counting result N of the counter 73a as expressed by the above Equation (2) (Step S109 in FIG. 25).

The counting device 7a performs the above-described process for the first oscillation period P1 and the second oscillation period P2.

Other configurations are the same as the first embodiment. If lowering of the signal strength of MHP and a mixture of burst noise in a signal input to the counting device 7 occur simultaneously, although a small number of MHPs may be counted in the first embodiment, such counting errors may be reduced according to the second embodiment.

In addition, although the frequency distribution of the half cycles of MHPs during the counting period is generated in Step S102 and the representative value T0 of the half cycles of MHPs is calculated from the frequency distribution in Step S103 in the second embodiment, the present invention is not limited thereto but the representative value calculator 742a may calculate the mean of half cycles of MHPs during the counting period as the representative value T0 from the measurement result of the half cycle measuring unit 740 in Step S103 without generating the frequency distribution in Step S102.

[Third Embodiment]

Next, a third embodiment of the present invention will be described. The third embodiment has the same configuration and process flow of the counting device as the second embodiment, and therefore will be described using reference numerals of FIGS. 23 to 25.

Steps S101 to S103 of FIG. 25 have the same process as those of the second embodiment.

Next, for the measurement result of the half cycle measuring unit 740, if a half cycle smaller than ½ of the representative value T0 lies between an m-th half cycle Tm which is equal to or larger than ½ of the representative value T0 and a p-th half cycle Tp which is equal to or larger than ½ of the representative value T0 (m and p are natural numbers), the signal combiner 744 of this embodiment takes a cycle, which is a combination of from the half cycle Tm to the half cycle Tp, as a half cycle after combination if (m+p) is an even number, takes a cycle, which is a combination of from the half cycle Tm to a half cycle Tn-1, as a half cycle after combination if (m+p) is an odd number, and takes a waveform generated by combining cycles as a waveform corresponding to the m-th half cycle (Step S105 in FIG. 25).

Figure 27A:
FIGS. 27A to 27C are views for explaining operation of a signal combiner of a counting device according to a third embodiment of the present invention.
Figure 27B:
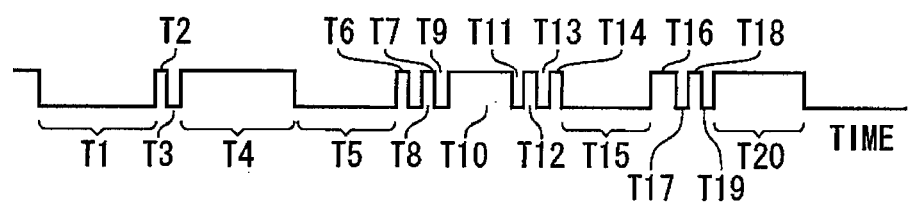
Figure 27C:
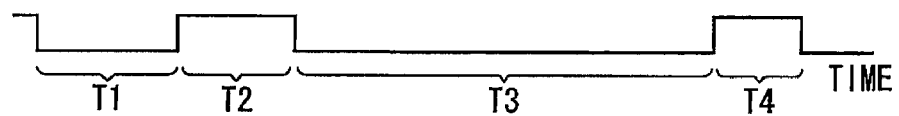

FIGS. 27A to 27C are provided to explain operation of the signal combiner 744 of this embodiment, FIG. 27A being a schematic view showing an MHP waveform, FIG. 27B being a view showing a measurement result of the half cycle measuring unit 740 and FIG. 27C being a view showing a processing result of the signal combiner 744.

When the half cycle measuring unit 740 measures an MHP half cycle shown in FIG. 27A, measurement results, which are half cycles T1 to T20, are obtained as shown in FIG. 27B. In this case, since the half cycles T2, T3, T6 to T14 and T16 to T19 are smaller than ½ of the representative value T0, T10 is not recognized as the MHP half cycle in the counting device 7 of the first embodiment, which causes an error in the counting result.

On the contrary, in the third embodiment, when the signal combiner 744 performs a combination process of the above signals, processing results, which are the half cycles T1, T2, T3 and T4, are obtained as shown in FIG. 27C. For example, the half cycles T2 and T3 lie between the half cycle T1 and the half cycle T4 which are equal to or lager than ½ of the representative value T0 and (m+p) is an odd number (5=1+4). Accordingly, waveforms of T1 to T3 are combined into a waveform corresponding to one MHP half cycle and a cycle, which is a combination of the half cycles T1 to T3, becomes the half cycle T1 after combination.

Similarly, the half cycles T6 to T14 lie between the half cycle T5 and the half cycle T15 which are equal to or lager than ½ of the representative value T0 and (m+p) is an even number (20=5+15). Accordingly, waveforms of T5 to T15 are combined into a waveform corresponding to one MHP half cycle and a cycle, which is a combination of the half cycles T5 to T15, becomes the half cycle T3 after combination. In addition, the half cycles T16 to T19 lie between the half cycle T3 after combination and the half cycle T20 which is equal to or lager than ½ of the representative value T0 and (m+p) is an odd number (23=3+20). Accordingly, waveforms of the half cycles T3 and T16 to T19 are combined into a waveform corresponding to one MHP half cycle and a cycle, which is a combination of the half cycles T3 and T16 to T19, becomes the half cycle T3 after combination. The processing results of the signal combiner 744 are stored in the storage 75.

Steps S106 to S109 of FIG. 25 have the same process as those of the second embodiment. Although a counting error may be lessened as compared to the first embodiment, if burst noise or popcorn noise having a cycle which is equal to or larger than a ¼ cycle of MHP is mixed in a signal input to the counting device 7a, the burst noise or the popcorn noise may be counted in the second embodiment, which may cause a counting error. On the contrary, such counting errors may be reduced according to the third embodiment even if such a mixture of noise occurs.

In addition, like the second embodiment, the representative value calculator 742a may calculate the mean of half cycles of MHPs during the counting period as the representative value T0 from the measurement result of the half cycle measuring unit 740 in Step S103 without generating the frequency distribution in Step S102.

In addition, the processes of Steps S106 and S107 are not requisite for the second and third embodiments. The reason for this is that there is no need to obtain a representative value again since the representative value before combination can be obtained with high precision using the frequency distribution. If the processes of Steps S106 and S107 are not performed, the correction value calculator 743a may use the representative value T0 calculated in Step S103. However, if it is considered that the representative value T0 calculated in Step S103 has low precision, the processes of Steps S106 and S107 may be performed.

[Fourth Embodiment]

Figure 28:
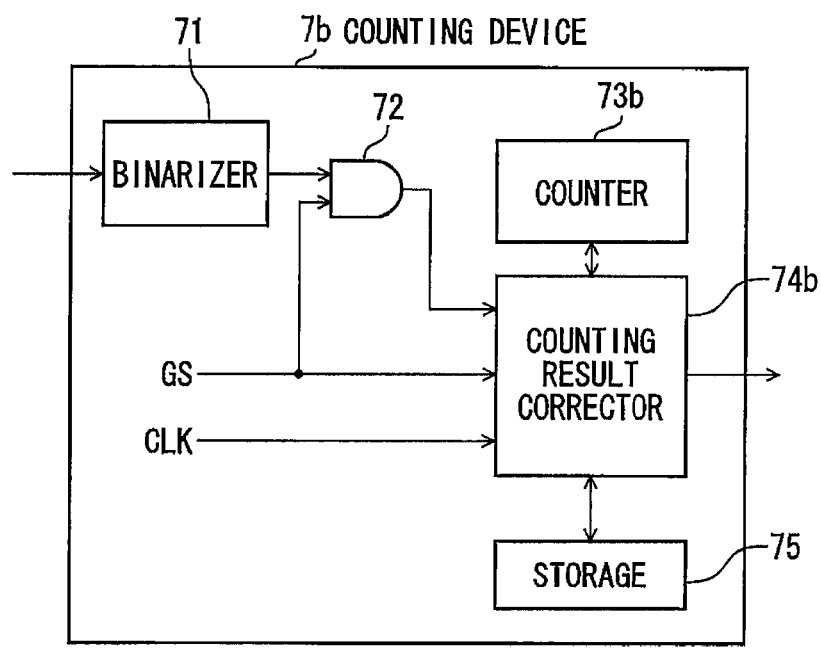
FIG. 28 is a block diagram showing one example of a configuration of a counting device according to a fourth embodiment of the present invention.

Next, a fourth embodiment of the present invention will be described. FIG. 28 is a view showing one example of a configuration of a counting device according to this embodiment. This embodiment uses a counting device 7b instead of the counting device 7 of the first embodiment. The counting device 7b includes a binarizer 71, an AND gate 72, a counter 73b, a counting result corrector 74b and a storage 75.

Figure 29:
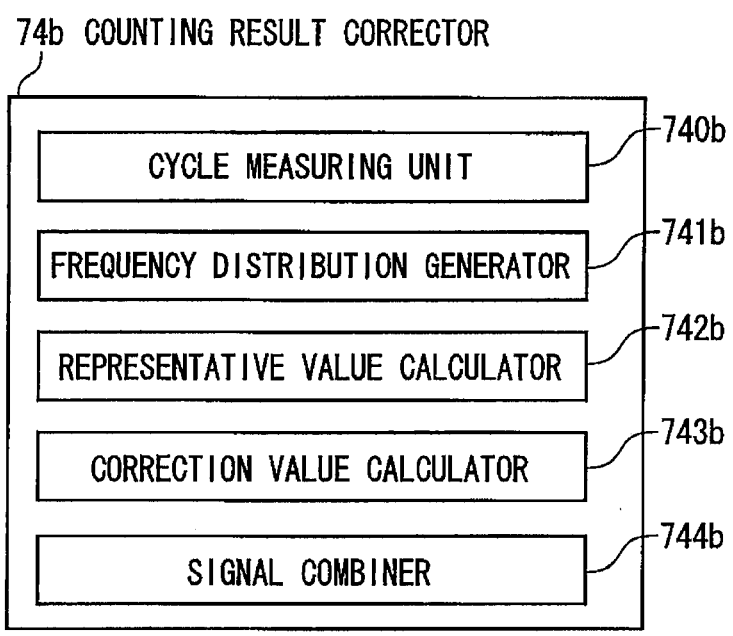
FIG. 29 is a block diagram showing one example of a configuration of a counting result corrector of the counting device according to the fourth embodiment of the present invention.

FIG. 29 is a block diagram showing one example of a configuration of the counting result corrector 74b of this embodiment. The counting result corrector 74b includes a cycle measuring unit 745, a frequency distribution generator 741b, a representative value calculator 742b, a correction value calculator 743b and a signal combiner 744b.

Figure 30:
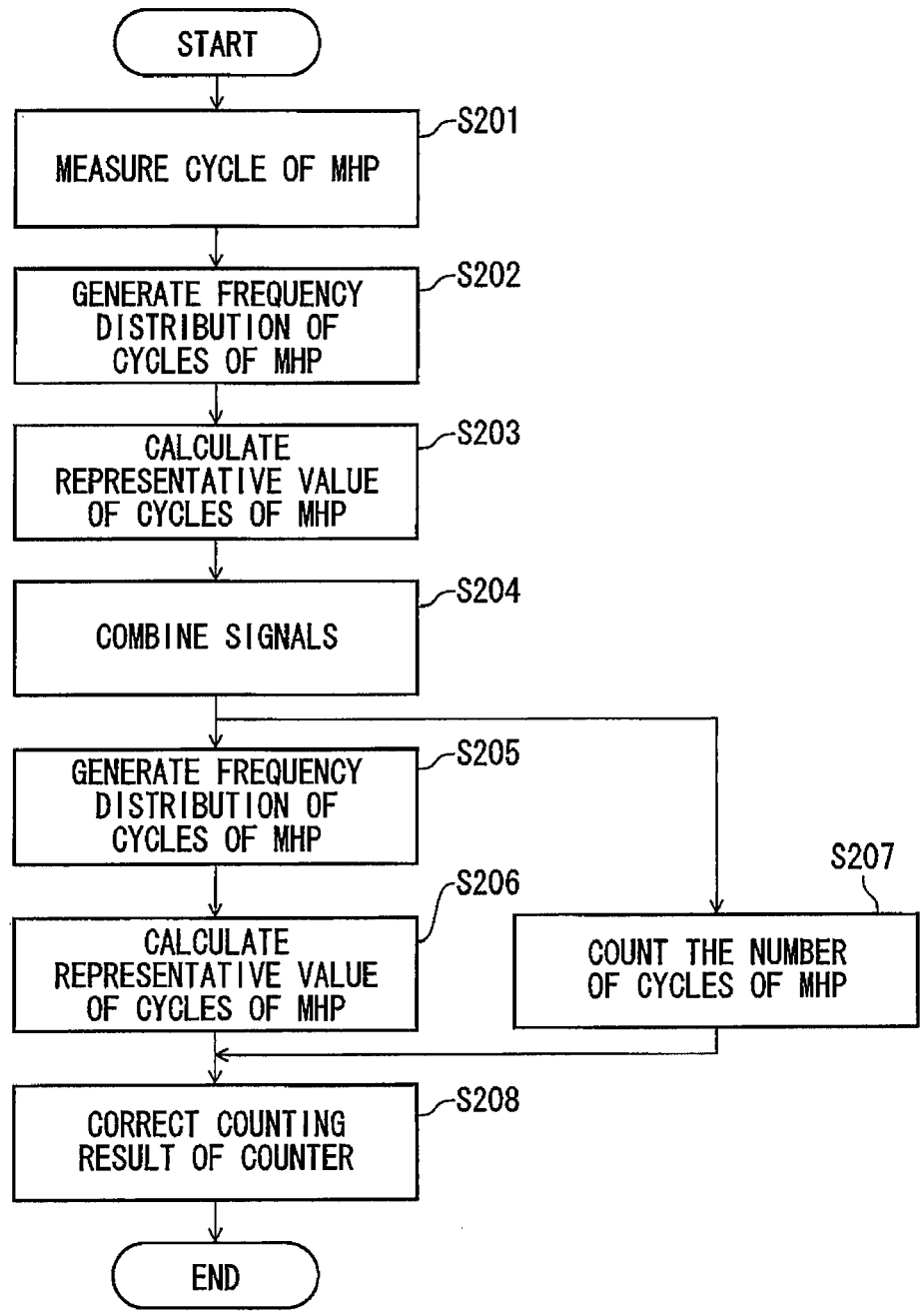
FIG. 30 is a flow chart showing operation of the counting device according to the fourth embodiment of the present invention.

FIG. 30 is a flow chart showing operation of the counting device 7b according to this embodiment. The cycle measuring unit 745 measures cycles of MHPs during a counting period (Step S201 in FIG. 30). Specifically, the cycle measuring unit 745 detects a rise in the output of the AND gate 72 while detecting a fall in the output of the AND gate 72. In addition, the cycle measuring unit 745 measures a cycle of the output (i.e., MHP cycle) of the AND gate 72 during the counting period by measuring a period from the rise in the output of the AND gate 72 to the next rise thereof. The cycle measuring unit 745 performs such measurement whenever a rising edge occurs in the output of the AND gate 72. Alternatively, the cycle measuring unit 745 may measure the MHP cycle by measuring a period from the fall in the output of the AND gate 72 to the next fall thereof. The storage 75 stores the measurement result of the cycle measuring unit 745.

After a gate signal GS falls and the counting period is ended, the frequency distribution generator 741b generates a frequency distribution of the cycles of MHPs during the counting period from the measurement result of the cycle measuring unit 745 stored in the storage 75 (Step S202 in FIG. 30).

Subsequently, the representative value calculator 742b calculates a representative value T0 of the MHP cycles from the frequency distribution generated by the frequency distribution generator 741b (Step S203 in FIG. 30). Here, the mode, median or mean of the MHP cycles may be taken as the representative value T0. Alternatively, the representative value calculator 742b may take a class value giving the maximum of the product of the class value and the frequency as the representative value T0.

Figure 31A:
FIGS. 31A to 31C are views for explaining operation of a signal combiner of the counting device according to the fourth embodiment of the present invention.
Figure 31B:
Figure 31C:
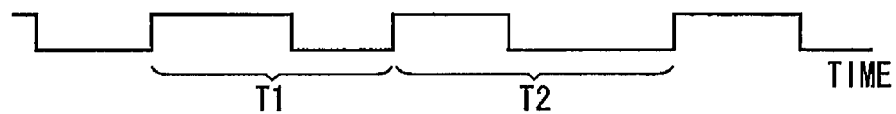
Figure 32:
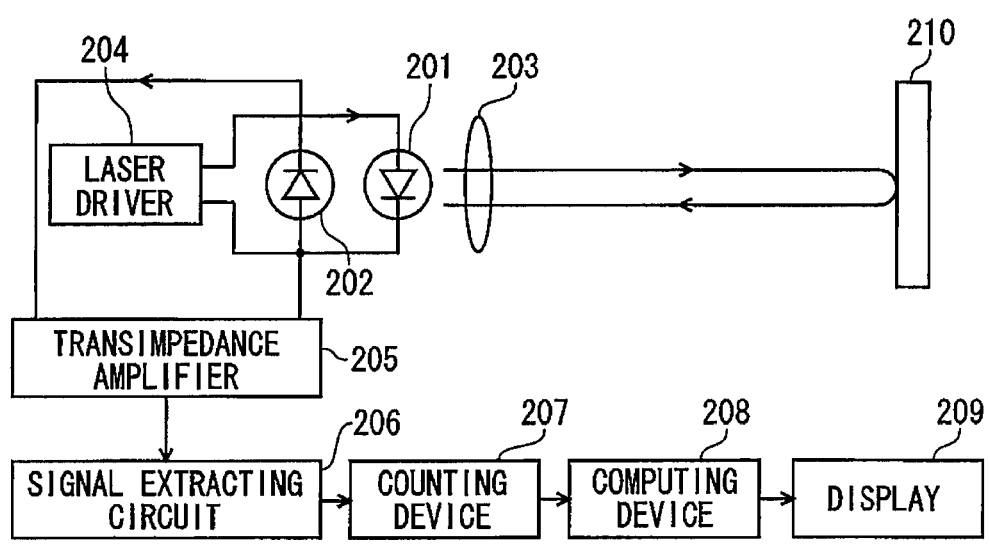
FIG. 32 is a block diagram showing a configuration of a related-art laser measuring instrument.

Next, for the measurement result of the cycle measuring unit 745, the signal combiner 744b performs a process of taking a cycle, which is a combination of a cycle smaller than ½ of the representative value T0 and a cycle measured immediately thereafter, as a cycle after combination and taking a waveform generated by combining cycles as a waveform corresponding to one cycle of one MHP, until the cycle after combination reaches ½ or more of the representative value T0 (Step S204 in FIG. 30). FIGS. 31A to 31C are views to explain operation of the signal combiner 744b. FIG. 31A is a schematic view showing an MHP waveform, FIG. 31B is a view showing a measurement result of the cycle measuring unit 745 and FIG. 31C is a view showing a processing result of the signal combiner 744b.

When the cycle measuring unit 745 measures an MHP cycle shown in FIG. 31A, measurement results, which are cycles T1 to T7, are obtained as shown in FIG. 31B. Among them, the cycles T1, T3, T4, T6 and T7 are caused by high frequency noise or the like. In this case, since the cycles T1 and T3 to T6 are smaller than ½ of the representative value T0, an error of the counting result occurs at sites T3 to T7 in the counting device 7 of the first embodiment.

On the contrary, in the fourth embodiment, when the signal combiner 744b performs a combination process of the above signals, processing results, which are the cycles T1 and T2, are obtained as shown in FIG. 31C. For example, a cycle which is a combination of the cycles T1 and T2 becomes the cycle T1 after combination and waveforms of T1 and T2 are combined into a waveform corresponding to one cycle of one MHP. Here, the waveforms of T1 and T2 are combined such that the cycle after combination is equal to or larger than ½ of the representative value T0. Similarly, a cycle which is a combination of the cycles T3 to T7 of FIG. 31B becomes the cycle T2 after combination as shown in FIG. 31C and waveforms of T3 to T7 are combined into a waveform corresponding to one cycle of one MHP. The processing results of the signal combiner 744b are stored in the storage 75.

Next, the frequency distribution generator 741b generates a frequency distribution of the cycles of MHPs during the counting period from the processing results of the signal combiner 744b stored in the storage 75 (Step S205 in FIG. 30).

Subsequently, the representative value calculator 742b calculates the representative value T0 of the MHP cycles from the frequency distribution generated in Step S205 by the frequency distribution generator 741b (Step S206 in FIG. 30). Accordingly, the representative value T0 stored in the storage 75 is updated as the newest value calculated in Step S206. Like Step S203, the mode, median or mean of the MHP cycles may be taken as the representative value T0, or alternatively, a class value giving the maximum of the product of the class value and the frequency may be taken as the representative value T0.

In the meantime, the counter 73b counts the number of MHPs processed by the signal combiner 744b (Step S207 in FIG. 30). Although the counter 73 of the first embodiment counts both of the rise and fall of MHPs, the counter 73b has only to count one of the rise and fall of MHPs.

Finally, the correction value calculator 743b obtains the total sum Ns of the number of cycles, which are smaller than ½ of the representative value T0, and the total sum $Nw_n$ of the number of cycles, which are equal to or larger than (n+0.5) times and smaller than (n+1.5) times (n is a natural number equal to or larger than 1 and equal to or smaller than $n_{max}$) the representative value T0, from the processing results of the signal combiner 744b and corrects the counting result of the counter 73b as expressed by the following Equation (Step S208 in FIG. 30).

$$N' = N - Ns + \sum_{n=1}^{n_{max}} (n \times Nw_n) \qquad (9)$$

$$n_{max} \leq \frac{T_{max}}{T0}$$

In Equation (9), N is the number of MHPs, which is the counting result of the counter 73b, N' is the counting result after correction, and $T_{max}$ is the maximum value which can be taken by the MHP cycle.

The counting device 7b performs the above-described process for the first oscillation period P1 and the second oscillation period P2.

Other configurations are the same as the first embodiment. The fourth embodiment can not obtain an effect of correcting the counting result using a representative value of half cycles as in the first embodiment, but, as described in the second embodiment, can reduce counting errors even if lowering of the signal strength of MHP and a mixture of burst noise in a signal input to the counting device 7b occur simultaneously.

In addition, although the frequency distribution of the cycles of MHPs during the counting period is generated in Step S202 and the representative value T0 of the cycles of MHPs is calculated from the frequency distribution in Step S203 in the fourth embodiment, the present invention is not limited thereto but the representative value calculator 742b may calculate the mean of cycles of MHPs during the counting period as the representative value T0 from the measurement result of the cycle measuring unit 745 in Step S203 without generating the frequency distribution in Step S202.

In addition, the processes of Steps S205 and S206 are not requisite for the fourth embodiment. The reason for this is that there is no need to obtain a representative value again since the representative value before combination can be obtained with high precision using the frequency distribution. If the processes of Steps S205 and S206 are not performed, the correction value calculator 743b may use the representative value T0 calculated in Step S203. However, if it is considered that the representative value T0 calculated in Step S203 has low precision, the processes of Steps S205 and S206 may be performed.

In addition, at least the counting devices 7, 7a and 7b and the computing device 8 in the first to fourth embodiments may be implemented by a computer including, for example, a CPU, a storage and an interface and a program for controlling these hardware resources. The program for operating such a computer is provided in a state where the program is recorded on a recording medium such as a flexible disk, a CD-ROM, a DVD-ROM, a memory card or the like. The CPU writes a read program in the storage and executes the processes described in the first to fourth embodiments according to the program.

In addition, although it has been illustrated in the first to fourth embodiments that the counting devices of the present invention are applied to a vibration frequency measurement device, the present invention is not limited thereto but the counting devices of the present invention may be applied to other various fields. The counting devices of the present invention can be effectively utilized when the number of signals to be counted has a linear relationship with particular physical quantities (the distance between the semiconductor laser 1 and the object 10 and the displacement of the object 10 in the first to fourth embodiments) and the signals have substantially the single frequency if the particular physical quantities are constant.

In addition, even if the signals have no single frequency, the counting devices of the present invention are effectively utilized with substantially a single frequency even when an enlargement of a cycle distribution is small for a particular physical quantity, such as a speed of an object which is vibrating at a frequency sufficiently lower than the counting period, for example, a frequency which is equal to or lower than 1/10 of the counting period.

In addition, a physical quantity sensor has been illustrated with the vibration frequency measurement device in the first to fourth embodiments, but, without being limited thereto, the present invention may be applied to other various physical quantity sensors. For example, the tension of an object may be calculated from the counting result of the counting devices, or the distance to an object and the speed of the object may be calculated from the counting result of the counting devices as disclosed in Patent Document 1. As can be seen from the fact that the physical quantity sensor can calculate various physical quantities, the above-mentioned particular physical quantities may be equal to or different from the physical quantities calculated by the physical quantity sensor.

The present invention is applicable to a counting device which counts the number of signals and an interference type physical quantity sensor which obtains physical quantities of an object to be measured by measuring the number of interference waveforms using the counting device.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

The invention claimed is:

1. A counting device which counts the number of signals having a linear relationship with a specific physical quantity, wherein the signals have substantially a single frequency if the specific physical quantity is constant, the device comprising:
a signal counter configured to count the number of half cycles of input signals during given counting periods;
a signal half cycle measurement unit configured to measure the half cycles of the input signals during the given counting periods whenever a half cycle of the signal is input;
a frequency distribution generator configured to generate a frequency distribution of the half cycles of the input signals during the given counting periods, based on a measurement result from the signal half cycle measurement unit;
a representative value calculator configured to calculate a representative value of a distribution of the half cycles of the input signals, based on the frequency distribution; and
a correction value calculator configured to calculate, based on the measurement result from the signal half cycle measurement unit, a to number Ns and a total number $Nw_n$ so as to correct the number of the half cycles of the input signals counted by the signal counter, wherein Ns represents the total of the number of the half cycles that are less than 0.5 times the represent value, and $Nw_n$ represents the total of the number of the half cycles that are equal to or greater than 2n and less than (2n+2) times the representative value, where n is a natural number of 1 or more.

2. The device according to claim 1,
wherein the correction value calculator is configured to calculate the corrected number N' of the half cycles of the input signal, based on the following expression:

$$N' = \frac{1}{2}\left\{N - Ns + \sum_{n=1}^{n_{max}} (2n \times Nw_n)\right\}$$

$$n_{max} \leq \frac{T_{max}}{T0}$$

wherein the number of the half cycles of the input signals counted by the signal counter is N, the representative value is T0 and the maximum value of the half cycles of the input signals is $T_{max}$.

3. The device according to claim 1, further comprising:
a signal combination unit configured to combine a first half cycle that is less than 0.5 times the representative value with at least one of second half cycles measured before and after the first half cycle so as to set the combined half cycle as a new half cycle of a signal waveform, wherein the signal counter is configured to count the number of the half cycles containing the new half cycles combined by the signal combination unit.

4. The device according to claim 3, wherein when the combined half cycle is less than 0.5 times the representative value, the signal combination unit continues to perform the combination process until newly-combined half cycle is equal to or greater than 0.5 times the representative value.

5. The device according to claim 3,
wherein when the first half cycle that is less than 0.5 times the representative value is between an m-th half cycle Tm and a p-th half cycle Tp, where Tm and Tp are equal to or greater than 0.5 times the representative value, and m and p are natural numbers,
the signal combination unit is configured to:
combine half cycles ranging from the half cycle Tm to the half cycle Tp so as to set the combined cycle as the m-th half cycle Tm, if (m+p) is an even number; and
combine half cycles ranging from the half cycle Tm to a half cycle Tn−1 so as to set the combined cycle as the m-th half cycle Tm, if (m+p) is an odd number.

6. The device according to claim 1, wherein the representative value is one of the median, the mode, the mean and a class value, the class value having a maximum value obtained by multiplying the class value by a frequency corresponding to the class value.

7. A physical quantity sensor comprising:
a semiconductor laser which emits laser light to an object to be measured;
an oscillation wavelength modulator configured to operate the semiconductor laser such that at least one of a first oscillation period and a second oscillation period repeatedly exists, wherein an oscillation wavelength continuously and monotonically increases during the first oscillation period, and the oscillation wavelength continuously and monotonically decreases during the second oscillation period;
a detector configured to detect electrical signals including interference waveforms, the interference waveforms being caused by a self-coupling effect of the laser light emitted from the semiconductor laser and return light from the object;
the counting device according to claim 1, which counts the number of interference waveforms, wherein the input signals are the electrical signals outputted from the detector, and the given counting periods are the first and second oscillation periods; and
a computing unit configured to calculate a physical quantity of the object based on a counting result from the counting device.

8. A method of counting the number of signals having a linear relationship with a specific physical quantity, wherein the signals have substantially a single frequency if the specific physical quantity is constant, the method comprising:
(a) counting the number of half cycles of an input signal during given counting periods using a signal counter;
(b) measuring, with a signal half cycle measurement unit, the half cycles of the input signals during the given counting periods whenever a half cycle of the signal is input;
(c) generating a frequency distribution of the half cycles of the input signals during the given counting periods, based on a measurement result in the step (b) with a frequency distribution generator;
(d) calculating a representative value of a distribution of the half cycles of the input signals, based on the frequency distribution using a representative value calculator; and (e) calculating, with a correction value calculator, based on the measurement result in step (b), a total number Ns and a total number $Nw_n$ so as to correct the number of the half cycles of the input signals in step (a), wherein Ns represents the total of the number of the half cycles that are less than 0.5 times the represent value, and $Nw_n$ represents the total of the number of the half cycles that are equal to or greater than 2n and less than (2n+2) times the representative value, where n is a natural number of 1 or more.

9. The method according to claim 8,
wherein step (e) comprises: calculating, with the correction value calculator, the corrected number N' of the half cycles of the input signal, based on the following expression:

$$N' = \frac{1}{2}\left\{N - Ns + \sum_{n=1}^{n_{max}} (2n \times Nw_n)\right\}$$

$$n_{max} \leq \frac{T_{max}}{T0}$$

wherein the number of the half cycles of the input signals counted in step (a) is N, the representative value is T0 and the maximum value of the half cycles of the input signals is $T_{max}$.

10. The method according to claim 8, further comprising:
(f) combining, with a signal combination unit, a first half cycle that is less than 0.5 times the representative value with at least one of second half cycles measured before and after the first half cycle so as to set the combined half cycle as a new half cycle of a signal waveform,
wherein step (a) comprises: counting, with the signal counter, the number of the half cycles containing the new half cycles combined by the signal combination unit.

11. The method according to claim 10,
wherein when the combined half cycle is less than 0.5 tunes the representative value, step (f) comprises: continuing to perform the combination process until newly-combined half cycle is equal to or greater than 0.5 times the representative value.

12. The counting method according to claim 10,
wherein when the first half cycle that is less than 0.5 times the representative value is between an m-th half cycle Tm and a p-th half cycle Tp, where Tm and Tp are equal to or greater than 0.5 times the representative value, and m and p are natural numbers,
step (f), performed by the signal combination unit, comprises:
combining half cycles ranging from the half cycle Tm to the half cycle Tp so as to set the combined cycle as the m-th half cycle Tm, if (m+p) is an even number; and
combining half cycles ranging from the half cycle Tm to a half cycle Tn−1 so as to set the combined cycle as the m-th half cycle Tm, if (m+p) is an odd number.

13. The counting method according to claim 8,
wherein the representative value is one of the median, the mode, the mean and a class value, the class value having a maximum value obtained by multiplying the class value by a frequency corresponding to the class value.

14. A physical quantity measuring method, comprising:
(a) operating a semiconductor laser, which emits laser light to an object to be measured, such that at least one of a first oscillation period and a second oscillation period repeatedly exists, wherein an oscillation wavelength continuously and monotonically increases during the first oscillation period, and the oscillation wavelength continuously and monotonically decreases during the second oscillation period;

(b) detecting electrical signals, with a detector, including interference waveforms, the interference waveforms being caused by a self-coupling effect of the laser light emitted from the semiconductor laser and return light from the object;

(c) counting the number of interference waveforms in accordance with the method of claim 8, wherein the input signals are the electrical signals, and the given counting periods are the first and second oscillation periods; and (d) calculating a physical quantity of the object based on a counting result obtained in step (c) performed by a computing unit.

* * * * *